US012591605B2

(12) United States Patent
Shin

(10) Patent No.: US 12,591,605 B2
(45) Date of Patent: Mar. 31, 2026

(54) COMPUTER SESSION MANAGEMENT USING A LANGUAGE MODEL

(71) Applicant: GOOGLE LLC, Mountain View, CA (US)

(72) Inventor: Dongeek Shin, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 68 days.

(21) Appl. No.: 18/332,356

(22) Filed: Jun. 9, 2023

(65) Prior Publication Data

US 2024/0411788 A1 Dec. 12, 2024

(51) Int. Cl.

| | |
|---|---|
| ***G06F 16/3329*** | (2025.01) |
| ***G06F 3/0483*** | (2013.01) |
| ***G06F 16/334*** | (2025.01) |
| ***G06F 16/338*** | (2019.01) |
| ***G06F 16/34*** | (2019.01) |
| ***G06F 40/35*** | (2020.01) |
| ***G06F 40/40*** | (2020.01) |

(52) U.S. Cl.

CPC ........ *G06F 16/3329* (2019.01); *G06F 3/0483* (2013.01); *G06F 16/3344* (2019.01); *G06F 16/338* (2019.01); *G06F 16/345* (2019.01); *G06F 40/35* (2020.01); *G06F 40/40* (2020.01)

(58) Field of Classification Search

CPC ............. G06F 16/3329; G06F 16/3344; G06F 16/338; G06F 16/345; G06F 40/35; G06F 40/40; G06F 3/0483

See application file for complete search history.

(56) References Cited

U.S. PATENT DOCUMENTS

| | | | | |
|---|---|---|---|---|
| 10,691,750 | B1 * | 6/2020 | Karppanen | G06F 16/9574 |
| 11,657,108 | B1 * | 5/2023 | Zakrevskis | G06F 16/954 715/738 |
| 2004/0064642 | A1 * | 4/2004 | Roskind | G06F 9/5016 707/E17.12 |
| 2009/0240686 | A1 * | 9/2009 | Murali | G06F 16/955 707/999.005 |

(Continued)

FOREIGN PATENT DOCUMENTS

WO 2020068169 A1 4/2020

OTHER PUBLICATIONS

Hemalatha, Mahalingam. "Intuitive content rendering by intelligently organizing browser tabs for enhanced user experience and better screen space utilization Smart Tabs-A new invention for intelligently organizing the browser tabs." 2015 IEEE International Advance Computing Conference (IACC). IEEE (Year: 2015).*

(Continued)

*Primary Examiner* — Mohsen Almani

(74) *Attorney, Agent, or Firm* — Brake Hughes Bellermann LLP

(57) ABSTRACT

According to an aspect, a method includes receiving, by a language model, session state information, generated by a browser application, about a computer session of a user, receiving, by the language model, a user-generated query including a natural language description about a browser tab, generating, by the language model, a textual response about the browser tab using contextual data, the contextual data including the session state information, and providing the textual response on a user device.

24 Claims, 13 Drawing Sheets

(56) References Cited

U.S. PATENT DOCUMENTS

| | | | | |
|---|---|---|---|---|
| 2013/0219277 | A1 | 8/2013 | Wang et al. | |
| 2015/0370787 | A1* | 12/2015 | Akbacak | G06F 40/47 704/2 |
| 2017/0199638 | A1* | 7/2017 | Bhupatiraju | G06F 16/9577 |
| 2017/0293419 | A1* | 10/2017 | Dipin | G06F 16/957 |
| 2018/0239826 | A1 | 8/2018 | Epstein et al. | |
| 2019/0391712 | A1* | 12/2019 | Singh | G06F 9/54 |
| 2020/0034399 | A1 | 1/2020 | Beno et al. | |
| 2020/0394234 | A1* | 12/2020 | Chikkala | G06F 16/9577 |
| 2021/0097120 | A1 | 4/2021 | Gutierrez et al. | |
| 2021/0232644 | A1* | 7/2021 | Shah | H04L 67/01 |
| 2022/0277142 | A1* | 9/2022 | Mohan | G06F 16/3329 |
| 2022/0308716 | A1* | 9/2022 | Rice | G06F 3/0484 |
| 2022/0309037 | A1* | 9/2022 | Gutierrez | G06F 16/16 |
| 2023/0195825 | A1* | 6/2023 | Rao | G06F 16/986 715/235 |
| 2024/0053944 | A1* | 2/2024 | Jia | G09G 5/14 |
| 2024/0221738 | A1* | 7/2024 | Garg | G10L 25/78 |
| 2024/0370479 | A1* | 11/2024 | Hudetz | G06F 16/316 |

OTHER PUBLICATIONS

Dipin, K. P., Joy Bose, and Sanjoy Pal. "User Friendly Tab Management in Web Browsers." 2019 16th IEEE Annual Consumer Communications & Networking Conference (CCNC). IEEE (Year: 2019).*

Kumar, Kapil, and Joy Bose. "User data management by tabs during a browsing session." 2014 Fourth International Conference on Digital Information and Communication Technology and its Applications (DICTAP). IEEE (Year: 2014).*

International Search Report and Written Opinion for PCT Application No. PCT/US2024/032387, mailed on Sep. 18, 2024, 13 pages.

* cited by examiner

500

Receiving, by a language model, session state information, generated by a browser application, about a computer session of a user — 502 receiving, by the language model, a user-generated query including a natural language description about a browser tab — 504 generating, by the language model, a textual response about the browser tab using contextual data, the contextual data including the session state information — 506

Providing the textual response on the user device — 508

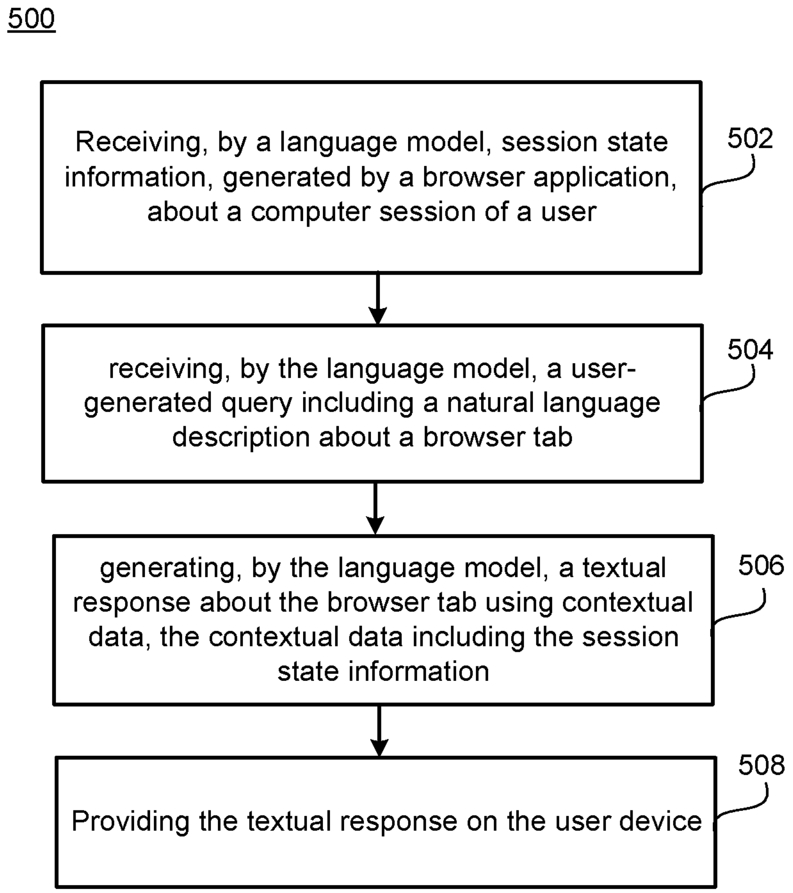

FIG. 5

COMPUTER SESSION MANAGEMENT USING A LANGUAGE MODEL

BACKGROUND

To manage open tabs on a computing device, a web browser may enable a user to organize the tabs into groups, stacks, or windows. In some examples, a web browser may provide keyboard shortcuts to switch between tabs, open new tabs, or close existing tabs. In some examples, a web browser may include a tab search feature that allows users to search for a specific tab or page among their open tabs, making it easier to locate and switch to a particular tab without having to manually navigate through many tabs. In some examples, the computing device includes a task manager that can search for open items on the computing device.

SUMMARY

This disclosure relates to a system that uses a language model to enable a user to locate or manage session items (e.g., application windows and/or browser tabs) displayed on a user device over a period of time based on natural language queries. In some examples, the system enables the user to manage session items with less user interaction than conventional management techniques. The language model may receive (e.g., periodically receive) a query from an application (e.g., a browser application), where the query includes session state information about session items that were opened by the user on the user device. The query is configured as a prompt that causes the language model to be conditioned (e.g., conditioned with in-context learning such as one-shot or multiple shot learning). In some examples, the query is referred to as an implicit query because it is generated in the background (e.g., by the system) without user prompting. In response to a user-generated (e.g., explicit) query (e.g., "where is my music tab") submitted via a user interface to the language model, the language model may identify one of the user's previously rendered tabs as relating to music and may generate a textual response about the location of the music tab (e.g., "it's the 3$^{rd}$ browser tab in the 2$^{nd}$ browser window"). In some examples, the user-generated query includes the session state information. In some examples, the language model generates and transmits an instruction (e.g., a browser instruction) to the application, where the instruction causes the application to visually identify the browser tab.

In some aspects, the techniques described herein relate to a computer-implemented method including: receiving, by a language model, session state information, generated by a browser application, about a computer session of a user; receiving, by the language model, a user-generated query including a natural language description about a browser tab; generating, by the language model, a textual response about the browser tab using contextual data, the contextual data including the session state information; and providing the textual response on a user device.

In some aspects, the techniques described herein relate to an apparatus including: at least one processor; and a non-transitory computer-readable medium storing executable instructions that cause the at least one processor to: receive, by a language model, session state information, generated by a browser application, about a computer session of a user; receive, by the language model, a user-generated query including a natural language description about a browser tab; generate, by the language model, a textual response about the browser tab using contextual data, the contextual data including the session state information; and provide the textual response on a user device.

In some aspects, the techniques described herein relate to a non-transitory computer-readable medium storing executable instructions that cause at least one processor to execute operations, the operations including: receiving, by a language model, session state information, generated by a browser application, about a computer session of a user; receiving, by the language model, a user-generated query including a natural language description about a browser tab; generating, by the language model, a textual response about the browser tab using contextual data, the contextual data including the session state information; and providing the textual response on a user device.

In some aspects, the techniques described herein relate to a method comprising: generating, by a browser application, session state information about a computer session of a user; transmitting, by the browser application, one or more prompts to a language model, the one or more prompts including the session state information and a user-generated query, the user-generated query including a natural language description about a browser tab; receiving, by the browser application and from the language model, a textual response about the browser tab; and displaying, by the browser application, the textual response on a display of a user device. In some aspects, the method further comprises: receiving, by the browser application and from the language model, a browser instruction; and executing, by the browser application, an action with respect to the browser tab.

The details of one or more implementations are set forth in the accompanying drawings and the description below. Other features will be apparent from the description and drawings, and from the claims.

BRIEF DESCRIPTION OF THE DRAWINGS

FIG. 5 is a flowchart depicting example operations of a system for managing session items using a language model according to an aspect.

DETAILED DESCRIPTION

Figure 1A:
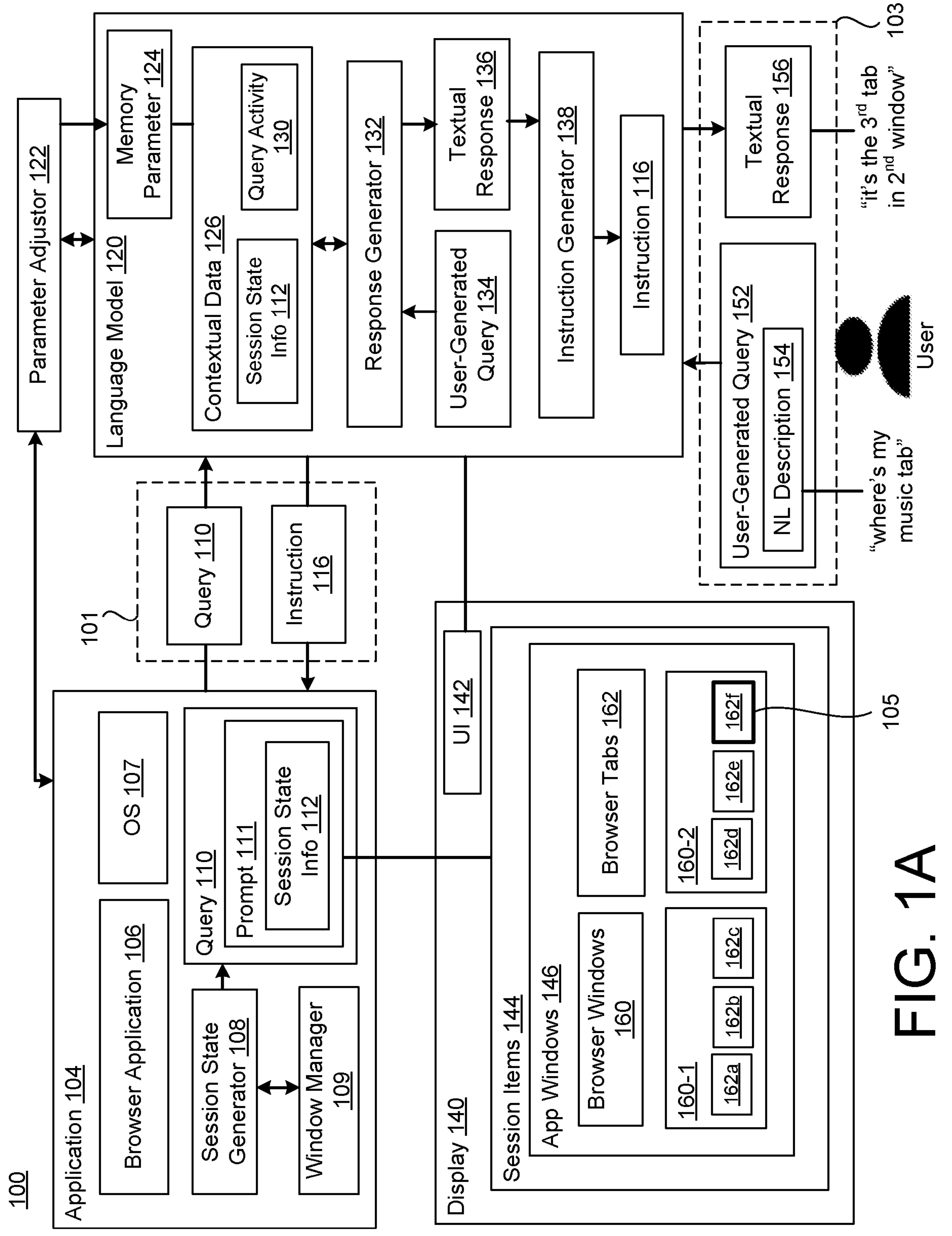
FIG. 1A illustrates a system that uses a language model to enable a user to locate, organize, and/or render session item(s) on a display of a user device based on natural language queries according to an aspect.
Figure 1B:
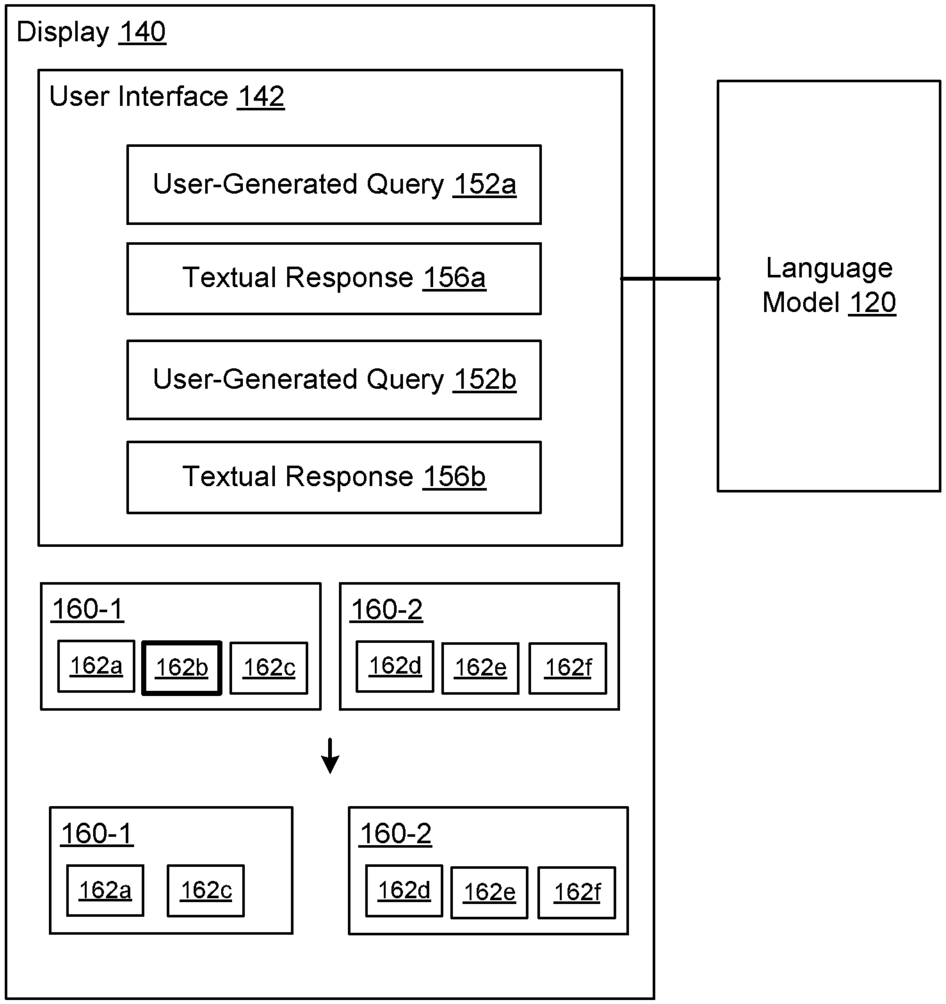
FIG. 1B illustrates an example of a user interface of the language model that displays user-generated queries and textual responses according to an aspect.

This disclosure relates to a system that uses a language model to enable a user to locate or manage session items (e.g., application windows and/or browser tabs) displayed on a user device over a period of time based on natural language queries. In some examples, the system includes a tab management feature that can manage browser tabs using a language model. Conventionally, a task manager or a tab searcher in a web browser may use keyword searching against resource locator parameters (e.g., uniform resource locator (URL) parameters), system calls, and/or other metadata about session items opened on the user device. However, keyword searching to identify browser tabs may limit the type of user queries (e.g., does not support natural language queries) and may cause increased user interaction with the user device (e.g., using more computer resources) because the task manager or the tab searcher may not semantically understand the content that is displayed (e.g., if the term music is not included in the metadata or URL parameters, then a conventional tab searcher or task manager would not be able to locate the browser tab).

Implementations of this disclosure provide a technical solution to support a wide range of natural language queries about computer content rendered on the user device while overcoming one or more technical problems of computer resource management (e.g., CPU, memory usage) associated with using a language model and/or data privacy associated with in-context learning using user-based information regarding which session items were launched on the user device. Some natural language queries supported by the system may include "Where's my music tab", "Group my music tabs", "What webpage did I read yesterday that discussed earthquakes" and/or "display that webpage in a new window."

The user device includes an application (e.g., a browser application, an operating system) configured to communicate with a language model via an application programming interface (API). The language model may be a large pre-trained natural language model. In some examples, the application may transmit a prompt to the language model via the API. In some examples, the prompt may include session state information about the session item(s) created on the user device. In some examples, the session state information is configured to condition the language model to predict textual responses about the user's session state information. In some examples, the language model may use the session state information as context for predicting textual responses about the session items. In some examples, the prompt may include a user-generated query and the session state information. In some examples, the user-generated query and the session state information are transmitted to the language model as separate prompts. In some examples, the prompt is generated by the application in the background without user prompting. In some examples, the prompt is generated by the application when a user submits a user-generated query, where the prompt includes the user-generated query and the session state information.

The user device provides a user interface (e.g., a chat interface) associated with the language model, where the user interface may receive user-generated queries about session items created by the user. The language model may receive, via the user interface, a user-generated query (e.g., a natural language description) about one or more session items displayed on the user device and the language model may generate a textual response about the session item(s) and provided the textual response in the user interface. In some examples, the language model may generate an instruction (e.g., a browser instruction, executable code, etc.) based on the textual response and may transmit the instruction to the application, which causes the application to execute an action with respect to the session item(s) (e.g., highlight the music tab, group the music tabs, render a new tab with the webpage that discussed a certain topic, etc.).

FIGS. 1A through 1I illustrate a system 100 that uses a language model 120 to enable a user to locate, organize, and/or render session item(s) 144 on a display 140 of a user device 102 based on a user-generated query 152. In some examples, the system 100 defines a tab management feature that can be used to manage browser tabs 162 opened by the user during a computer session based on natural language queries. In some examples, the system 100 defines a more general computer management system in which the user can manage browser tabs 162 as well as other session items 144 created by the user (e.g., non-browser applications, settings, display states, etc.).

The session item(s) 144 may include application windows 146 (e.g., browser tabs 162 and/or applications windows 146 associated with other applications) that were opened by the user. In some examples, the session items 144 may include other types of items that are enabled, set, or created during a computer session such as settings (e.g., operating system settings, browser settings) and/or display states such as split screen, picture-in-picture, and/or full-screen mode, etc. The system 100 discussed herein provides a technical solution to support a wide range of user-generated queries 152 (e.g., natural language queries) about computer content (e.g., session items 144) rendered on the display 140 while overcoming one or more technical problems of computer resource management (e.g., central processing unit (CPU), memory usage) associated with using a language model 120 and/or data security associated with in-context learning using information about a user's computer activity (e.g., session state information 112).

The language model 120 may receive (e.g., periodically receive) a query 110 from an application 104 executing on a user device 102. In some examples, the query 110 is an implicit query because it is generated in the background without user prompting. The query 110 includes session state information 112 about session items 144 (e.g., application windows 146, browser windows 160, browser tabs 162) that were opened (e.g., created, launched, enabled) by the user on the user device 102. The session state information 112 may include information about the user's computer activity such as which application windows 146 were opened, information about the underlying resource (e.g., webpage, application, and/or program), and/or content 145 displayed in an application window 146. The query 110 is configured as a prompt 111 that causes the language model 120 to be conditioned to predict textual responses 156 using the session state information 112 (e.g., in-context learning such as one-shot or multiple shot learning). When received at the language model 120, the language model 120 uses the session state information 112 as contextual data 126 for predicting textual responses 156. In some examples, storing the session state information 112 includes converting the session state information 112 to word tokens and storing (e.g., temporarily storing) the word tokens as contextual data 126.

A user may submit a user-generated query 152 via a user interface 142 (e.g., a chat interface), where the user-generated query 152 includes a natural language description 154 about a session item 144 (e.g., "where is my music tab"). In some examples, the session state information 112 is transmitted to the language model 120 as part of the user-generated query 152. In other words, the query 110 and the user-generated query 152 is a single query, the user-generated query 152 may include the natural language description 154 and the session state information 112. The language model 120 includes a response generator 132 that uses contextual data (e.g., the session state information 112, and, in some examples, query activity 130) to generate a textual response 156 about the session item(s) 144 (e.g., "it's the 3$^{rd}$ browser tab in the 2$^{nd}$ browser window"), which can be provided back in the user interface 142. In some examples, the language model 120 includes an instruction generator 138 that generates and transmits an instruction 116 (e.g., executable code) to the application 104 which causes the application 104 to execute an action with respect to the session item 144 (e.g., highlight the music tab or render the music tab in the foreground).

As shown in FIG. 1A, the user may open a browser window 160-1 with a browser tab 162*a*, a browser tab 162*b*, and a browser tab 162*c* and a browser window 160-2 with a browser tab 162*d*, and a browser tab 162*f* on the display 140. The browser tabs 162*a* through 162*f* may include various applications and/or web documents (e.g., webpages, images, videos, etc.). The browser tab 162*a* may include a news webpage, the browser tab 162*b* may execute a gaming web application, the browser tab 162*c* may display an online word document, the browser tab 162*d* may display a customer relationship management (CRM) webpage, the browser tab 162*e* may display a search results page, and the browser tab 162*f* may display a music streaming webpage.

In response to a user-generated query 152 (e.g., "where is my music tab") submitted via the user interface 142, the language model 120 may identify the browser tab 162*f* as a browser tab 162 relating to music using the session state information 112 (e.g., by comparing the term music and any related terms to information about the open browser tabs 162). The language model 120 may then generate a textual response 156 about the location of the music tab (e.g., "it's the 3$^{rd}$ browser tab in the 2$^{nd}$ browser window"). In some examples, the language model 120 generates and transmits an instruction 116 to the application 104, where the instruction 116 causes the application 104 to identify the browser tab 162*f*. In some examples, the instruction 116 includes code, generated by the language model 120, that when executed by the application 104 causes the application 104 to execute an action. In some examples, the instruction 116 is a browser instruction to be executed by the browser application 106. In some examples, in response to the instruction 116, the application 104 may visually highlight the browser tab 162*f*. In some examples, the application 104 may add a visual element 105 in order to highlight the browser tab 162*f*. In some examples, the application 104 causes the browser tab 162*f* to be rendered in a foreground of the display 140 to visually highlight the browser tab 162*f*.

The system 100 may include a wide variety of actions that can be generated via the language model 120. For example, in response to a user-generated query 152 (e.g., "close my news tab"), the language model 120 may identify the browser tab 162*a* as relating to news and may generate an instruction 116 that causes the application 104 to close (e.g., terminate, remove) the browser tab 162*a*. In response to a user-generated query 152 (e.g., "group my work tabs"), the language model 120 may identify the browser tab 162*c* and the browser tab 162*d* as related to work and may group the browser tab 162*c* and the browser tab 162*d* together (e.g., create a new browser window 160 with the browser tab 162*c* and the browser tab 162*d*). Other actions may include opening a new tab with a certain webpage, navigating a particular open browser tab 162 to a different webpage, de-duplicating browser tabs 162 with the same content, bookmarking a webpage displayed in a certain browser tab 162, etc.

The language model 120 may be a large pre-trained language model configured with in-context learning. In-context learning is a natural language processing (NPL) technique that includes conditioning a pre-trained language model on a specific domain by providing the pre-trained model with additional data (e.g., session state information 112) that is specific to that domain. The language model 120 may include one or more neural networks 180, and the neural network(s) 180 may be already pre-trained with a relatively large amount of training data to generate weights 175 associated with the neural network(s) 180. The language model 120 uses in-context learning to condition (e.g., fine-tune, calibrate, adjust) the already pre-trained language model to generate textual responses 136 about previously rendered session items 144 for a given user-generated query 152. According to the techniques discussed herein, in-context learning may include receiving and using the session state information 112 as contextual data 126, which may cause the language model 120 to be conditioned to generate a textual response 156 for a given user-generated query 152 about one or more session items 144 that were opened or enabled on the user device 102. In some examples, conditioning the language model 120 does not involve adjusting one or more of the weights 175 of the language model 120.

The user interface 142 may be a direct interface 103 between the user and the language model 120. In some examples, the user interface 142 is an interface associated with the language model 120. In some examples, the user interface 142 is an interface associated with the application 104 (e.g., the browser application 106). The user interface 142 may be an interface that displays textual information regarding the user-generated queries 152 and the textual responses 156. In some examples, the user interface 142 may be an interface configured to receive a user-generated query 152 via a voice command and may display the textual response 156 or may provide the textual response 156 as audio data. A user-generated query 152 received via the user interface 142 is provided (e.g., directly provided) to the language model 120. A textual response 136, generated by the language model 120, is provided for display on the user interface 142. In some examples, the user interface 142 includes a UI object having a text entry field for entering user-generated queries 152. In some examples, the user interface 142 may be fixed to a location on the display 140 and/or may move to other portions of the display 140. In some examples, the user interface 142 is a UI object that is positioned in a browser tab 162. In some examples, the user interface 142 is an extension (e.g., application or web application) to the browser application 106. In some examples, the user interface 142 is associated with the operating system 107 of the user device 102.

In some examples, the user interface 142 is a chat interface that identifies a history of the user-generated queries 152 and textual responses 156 generated by the language model 120. For example, referring to FIG. 1B, a user may enter a user-generated query 152*a* in the user interface 142 (e.g., "identify my gaming tab"), and the user interface 142 may display a textual response 156*a* (e.g., "it's the second tab in the first browser window") in response to the user-generated query 152*a*. In some examples, the language model 120 may generate an instruction 116 that causes the application 104 to visually identify the browser tab 162*b*. Then, the user may enter a user-generated query 152*b* in the user interface 142 (e.g., "delete that tab"), and the user interface 142 may display a textual response 156*b* (e.g., "ok, it's deleted"). Also, the language model 120 may generate an instruction 116 that causes the application 104 to delete the browser tab 162*b*. The user-generated queries 152 and the textual responses 156 may be stored (e.g., temporarily stored) as query activity 130 as contextual data 126.

The application 104 and the language model 120 are configured to communicate with each other. In some examples, the application 104 and the language model 120 are configured to communicate with each other via an implicit interface 101. In some examples, the implicit interface 101 is an application programming interface (API). In some examples, the application 104 and the language model 120 are configured to communicate with each other via inter-process communication (IPC) and/or a remote procedure call (RPC). In some examples, the application 104 is a browser application 106. In some examples, the browser application 106 is a web browser configured to render browser tabs 162 in the context of one or more browser windows 160. In some examples, the browser application 106 is an operating system 107 or part of the operating system 107 of the user device 102. In some examples, the application 104 is an operating system 107 of the user device 102. In some examples, the application 104 is a program or a native application installed on the operating system 107 of the user device 102.

Figure 1C:
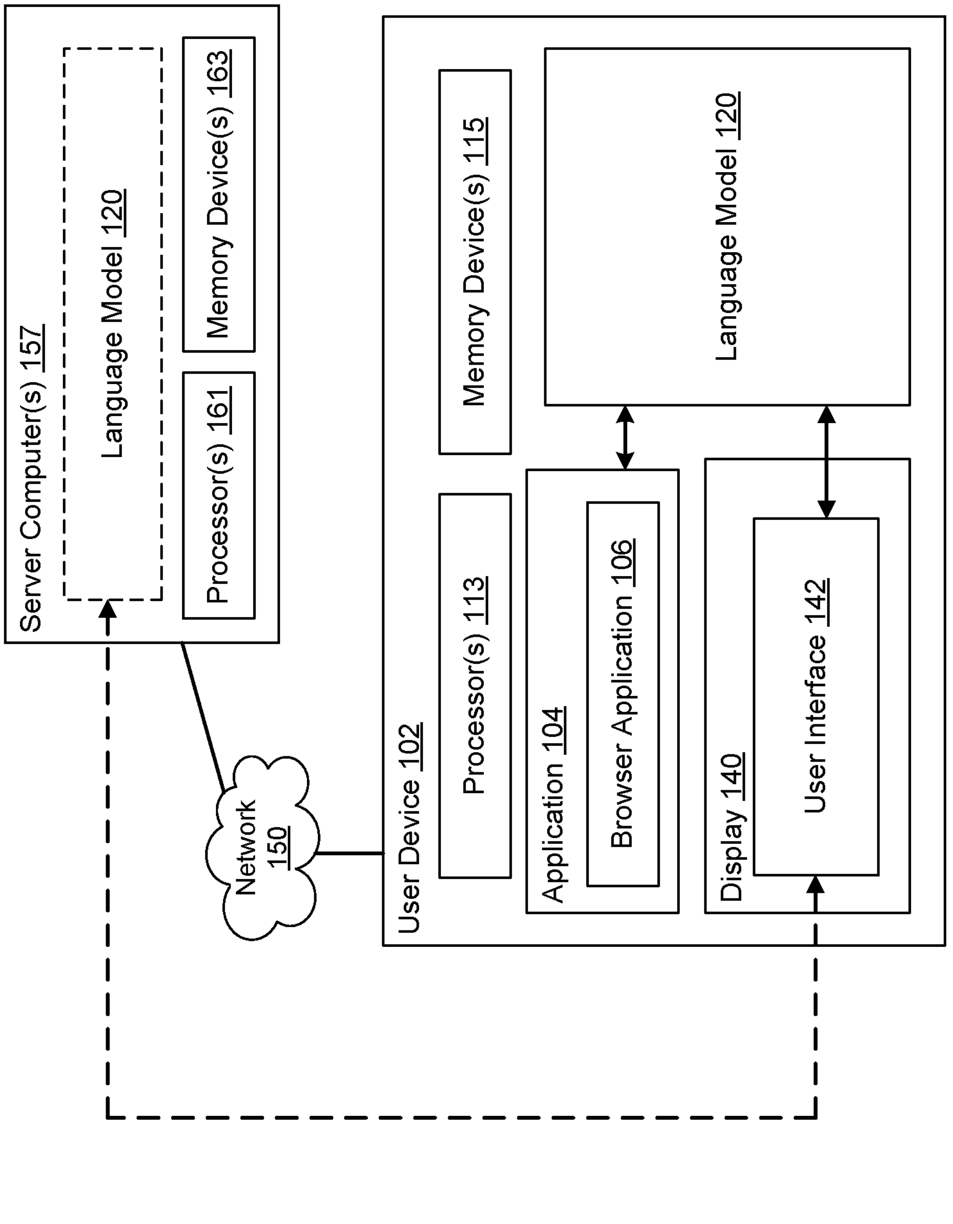
FIG. 1C illustrates an example of the system in which the language model may execute at a user device or one or more server computers according to an aspect.

Referring to FIG. 1C, in some examples, the language model 120 may execute on the user device 102. In some examples, the techniques discussed herein may enable the language model 120 to be relatively small (e.g., less memory, less computing power) to execute on the user device 102. For example, a memory parameter 124 may be set and/or controlled to balance and limit computer resources (e.g., CPU, memory) while enabling a wider range of queries. In some examples, the language model 120 may be associated with a user account and execute on one or more server computer(s) 157, and the user interface 142 is rendered on the user device 102. In some examples, the user interface 142 is an extension to the browser application 106, and, when the extension is enabled, the query 110 is transmitted to the language model, which then allows the user to use the user interface 142 to query the language model 120 about one or more session items 144 created on the user device 102. In some examples, the session state information 112 is transmitted to the language model 120 via the user-generated query 152.

Referring back to FIG. 1A, the language model 120 includes a memory parameter 124 that represents an amount of contextual data 126 that is used to predict a textual response 136 about the session item(s) 144 for a given user-generated query 152. In some examples, the memory parameter 124 is an adjustable attribute of the language model 120. In some examples, the memory parameter 124 is an auto-regressive parameter of the language model 120. The contextual data 126 may include the session state information 112 received from the application 104, and, in some examples, query activity 130 associated with the language model 120. The query activity 130 may include previous user-generated queries 152 submitted by the user and textual responses 136 generated by the language model 120.

The memory parameter 124 may control the amount of information that is used to predict the textual response 136. In some examples, the memory parameter 124 is a threshold defined in terms of characters or words (e.g., a ten-thousand-word limit). As such, when the value of the memory parameter 124 is relatively high, the amount of session state information 112 and/or query activity 130 can be higher for predicting a textual response 136, which may increase the accuracy of the prediction. However, when the value of the memory parameter 124 is relatively high, the size/complexity of the language model 120 may increase, thereby increasing the amount of computing resources that are used to compute the prediction. Therefore, the value of the memory parameter 124 may correspond to a level of computer resources used to generate a prediction.

Also, when the value of the memory parameter 124 is relatively high, a greater amount of session state information 112 may be used as contextual data 126 for generating a textual response 136, which may enable a wider range of user-generated queries 152. For example, in response to a query ("identify my news tabs"), the language model 120 can determine which of the open browser tabs 162 relate to news from the session state information 112 such as keyword or similar keywords found in resource parameters (e.g., uniform resource locator (URL) parameters), metadata, and/or a short description of the type of webpage rendered in the browser tab 162. However, in response to a query ("identify a website that I read yesterday that talked about earthquakes"), the language model 120 may require the content of the webpages and previous browsing history to determine which of the webpages discussed earthquakes, which may require a relatively larger amount of session state information 112 and/or query activity 130 for the prediction.

In some examples, a higher level of session state information 112 being used as contextual data 126 to generate a textual response 136 may increase the severity of a data security breach at the language model 120. For example, if the amount of session state information 112 that is used by the language model 120 is high, an unauthorized person (e.g., attacker) who obtains access to the language model 120 may learn more details about the user than if the amount of session state information 112 is relatively low. As such, the value of the memory parameter 124 may correspond to a level of data security and/or data privacy.

The value of the memory parameter 124 may be set to balance computer resource usage and/or data security associated with in-content learning using the session state information 112. In some examples, the system 100 includes a parameter adjustor 122 configured to adjust the memory parameter 124 to account for computer resource usage, data security, and/or the user activity associated with the application 104 and/or the language model 120. In some examples, the parameter adjustor 122 is configured to communicate with the language model 120 and/or the application 104 (e.g., browser application 106) to obtain information stored at the language model 120 and/or the application 104 to determine whether to adjust the memory parameter 124. In some examples, the parameter adjustor 122 is included as part of the language model 120. For example, the parameter adjustor 122 may be a language model subroutine, which is invoked (e.g., periodically invoked) to determine whether to adjust the memory parameter 124. In some examples, the parameter adjustor 122 is included as part of the application 104.

In some examples, the parameter adjustor 122 may adjust the memory parameter 124 based on the session state information 112 and/or the query activity 130 from the language model 120 and/or information from the application 104. In some examples, the parameter adjustor 122 may adjust the memory parameter 124 based on the query activity 130 of the language model 120. For example, using the query activity 130, the parameter adjustor 122 may determine whether a number of previous user-generated queries 134 involve session items 144 created within a threshold period of time (e.g., a short period of time such as today or yesterday), and, if so, may decrease the value of the memory parameter 124. In some examples, the parameter adjustor 122 may determine whether a number of previous user-generated queries 134 involve session items 144 created over a threshold period of time (e.g., more than one day, more than one week, etc.), and, if so, may increase the memory parameter 124.

In some examples, the parameter adjustor 122 is configured to adjust the memory parameter 124 based on the session state information 112. In some examples, the parameter adjustor 122 may use the session state information 112 to determine whether the user's computer usage (e.g., the number of session items 144 that are opened) within a threshold period of time exceeds a threshold level. For example, if the user's computer usage is relatively high, there may be a greater chance that the user will submit user-generated queries 152 about one or more of the session items 144.

In some examples, the parameter adjustor 122 controls the amount of session state information 112 based on the user's activity. For example, the parameter adjustor 122 may cause the session state generator 108 to generate more session state information 112 for session items 144 (or types of session items 144) that are frequently opened by the user on the user device 102. For example, the parameter adjustor 122 may determine that the user frequently opens news tabs (e.g., a new tab may be a browser tab 162 with a webpage or application relating to news) and may direct the session state generator 108 to obtain more session state information 112 about the news tabs opened by the user (e.g., such as the content 145 or obtain a summary 147 of the content 145).

The application 104 includes a session state generator 108 configured to generate session state information 112 about one or more session items 144 enabled or rendered on a display 140 of the user device 102. A user may be provided with controls allowing the user to make an election as to both if and when the system 100 described herein may enable collection of user information (e.g., such as the session state information 112 (or a portion thereof)), and/or whether or not to enable the language model 120 to operate with respect to the user's computing session (e.g., using session state info 112 and/or query activity 130). In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

In some examples, the session state generator 108 may include (or communicate with) a window manager 109 to obtain at least a portion of the session state information 112. In some examples, the window manager 109 is a software program of the browser application 106. In some examples, the window manager 109 is a software program of the operating system 107 of the user device 102. The window manager 109 may manage the graphical user interface by controlling the placement, sizing, and appearance of application windows 146 on the display 140. In some examples, the session state generator 108 may communicate with other components (e.g., on the user device 102 or a server computer) to obtain information about the session items 144. In some examples, as further discussed with respect to FIG. 1G, the session state generator 108 may obtain a summary 147 of content 145 (e.g., a webpage or other content rendered in an application window 146) from a summary language model **120*a* and include the summary in the session state information 112**.

The session items 144 may include application windows 146 that have been opened by the user. An application window 146 may be a graphical user interface element that represents an application executing on or associated with the operating system 107 of the user device 102. In other words, the session items 144 may be applications that are launched by the user, which may encompass browser tabs 162 (and associated functionalities such as web application and extensions) and other types of applications such as native applications, programs, etc. In some examples, the session items 144 may include other items that are created or enabled by the user during a computing session such as split-screen, picture-in-picture, full-mode display, etc.

The application windows 146 may include browser windows 160 and browser tabs 162 rendered by a browser application 106. A browser application 106 is a web browser configured to access information on the Internet. The browser application 106 may launch one or more browser tabs 162 in the context of one or more browser windows 160 on a display 140 of the user device 102. A browser tab 162 may display content (e.g., web content) associated with a web document (e.g., webpage, PDF, images, videos, etc.) and/or an application such as a web application, progressive web application (PWA), and/or extension. A web application may be an application program that is stored on a remote server (e.g., a web server) and delivered over the network 150 through the browser application 106 (e.g., a browser tab 162). In some examples, a progressive web application is similar to a web application but can also be stored (at least in part) on the user device 102 and used offline. An extension adds a feature or function to the browser application 106. In some examples, an extension may be HTML, CSS, and/or JavaScript based (for browser-based extensions).

In some examples, the application windows 146 may correspond to other applications, programs, and/or computer files (e.g., in addition to browser tabs 162). For example, the application window 146 may correspond to other native applications (e.g., non-browser applications) executing on the operating system 107 of the user device 102 and/or system programs included in the operating system 107 of the user device 102.

Figure 1D:
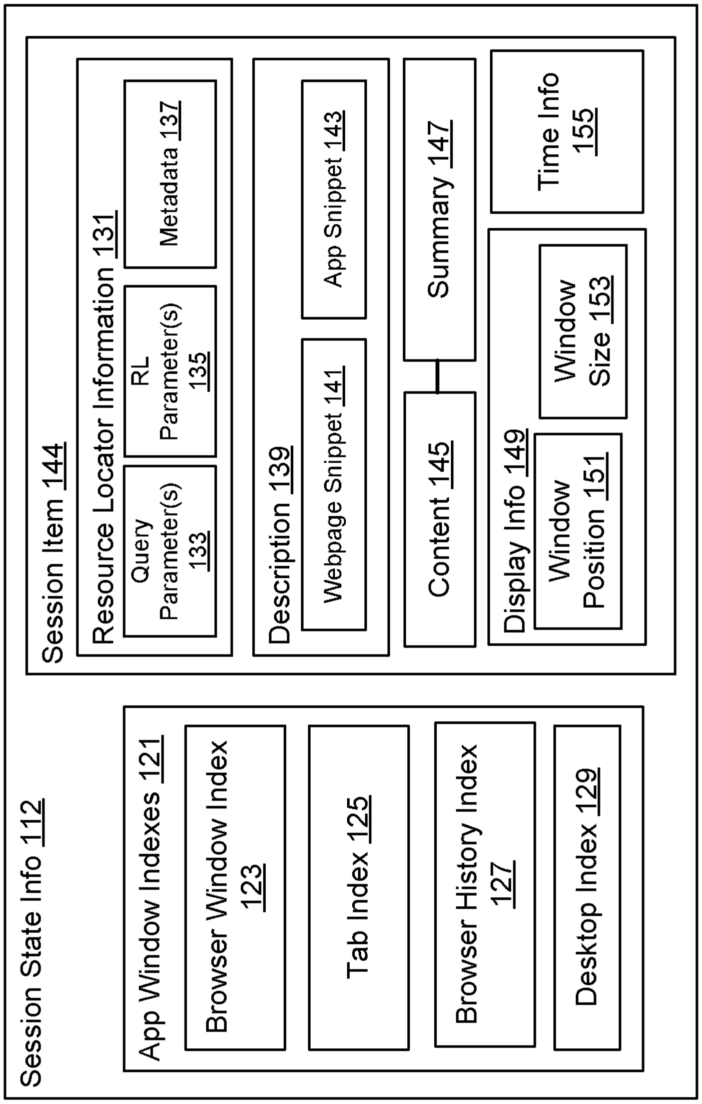
FIG. 1D illustrates various examples of session state information according to an aspect.

Referring to FIG. 1D, the session state information 112 may include one or more application window indexes 121 associated with the application windows 146. Generally, an application window index 121 may be an identifier (e.g., a window ID) assigned to an application window 146 displayed on the display 140. In some examples, the identifiers are assigned by the window manager 109. In some examples, an application window index 121 includes an index vector having one or more identifiers (e.g., unique identifiers that can identify the application windows 146). For example, if there are more than one application window 146 displayed on the display 140, the application window index 121 includes a plurality of identifiers (e.g., an index vector), where an identifier corresponds to a separate application window 146.

In some examples, the session state information 112 may include a single application window index 121 that identifies any application window 146 displayed on the display 140, and, in some examples, a relationship with another application window 146. For example, the application window index 121 may associate browser tab 162*a*, browser tab 162*b*, and browser tab 162*c* with browser window 160-1, and browser tab 162*d*, browser tab 162*e*, and browser tab 162*f* with browser window 160-2. However, the application window index 121 may identify relationships with other computer elements (e.g., desktops (also referred to as virtual desktops) and users (or user accounts)). For example, the application window index 121 may identify browser window 160-1 and browser window 160-2 with a particular desktop (e.g., if multiple desktops are created by the user) and/or with a particular user identifier (e.g., if multiple users are configured to use the user device 102).

In some examples, the application window indexes 121 may include multiple (smaller) application window indexes 121. For example, the application window indexes 121 may include a browser window index 123 that includes an identifier (e.g., a window ID) assigned to each browser window 160 displayed on the display 140. The application window indexes 121 may include a tab index 125 that includes an identifier (e.g., a tab ID) assigned to each browser tab 162 displayed within a respective browser window 160. In some examples, the application window indexes 121 include a browser history index 127 that identifies a web document or application rendered in a browser tab 162 (e.g., title, URL, metadata, etc.). In some examples, the application window indexes 121 include a desktop index 129 that includes an identifier (e.g., desktop ID) for each desktop created on the user device 102 and which application window 146 corresponds to which desktop. The identifiers (e.g., window IDs, tab IDs, desktop IDs, etc.) may be used to programmatically organize (e.g., move, switch, open, close, or other actions) the application windows 146.

The session state information 112 may include information about each session item 144 (e.g., each window ID, browser window ID, and/or tab ID). In some examples, the session state information 112 may include resource locator information 131 that identifies a location of (and, in some examples, other information associated with) a resource (e.g., web document, application) corresponding to an application window 146. The resource locator information 131 may include query parameter(s) 133, resource locator (RL) parameter(s) 135, and/or metadata 137. The RL parameters 135 may include an address (e.g., a web address), a domain name, path information, and other information that can identify a resource on a server computer or the user device 102. The query parameter(s) 133 may include additional information about the resource such as filtering or sorting options. The metadata 137 may include a wide variety of information such as the title of the resource, a description (e.g., description 139), keywords, an author, a language of the resource, a viewport of the resource (e.g., dimensions and scaling of a webpage).

In some examples, the session state information 112 may include a description 139 of the resource associated with the application window 146. In some examples, the description 139 is included as part of the metadata 137. In some examples, the description 139 is included in a head section of an HTML document. In some examples, the description 139 includes a webpage snippet 141 (e.g., a snippet description) that provides a brief summary or description of the webpage's content. In some examples, the description 139 includes an application snippet 143 (e.g., a snippet description) that provides a brief summary or description of the application corresponding to the application window 146.

In some examples, the session state information 112 includes the content 145 of a web document rendered in a browser tab 162. The content 145 may include the page description of the web document. In some examples, the content 145 may include the web content of the web document. In some examples, instead of including the content 145, the session state information 112 may include a summary 147 of the content 145. In some examples, the summary 147 is generated by a summary language model 120*a* as further discussed with reference to FIG. 1G. In some examples, the session state information 112 may include display information 149 about a location of an application window 146 on the display 140. The display information 149 may include a window position 151, a window size 153, and/or time information 155 about a time in which the application window 146 was rendered.

The application 104 may transmit a query 110 with the session state information 112 to the language model 120. In some examples, the application 104 may periodically transmit the query 110. In some examples, the application 104 may transmit (e.g., periodically transmit) the query 110 when the user interface 142 of the language model 120 is opened on the user device 102. In some examples, the application 104 may transmit the query 110 in response to a session item event. A session item event may be a user action taken in response to a session item 144 (e.g., open a new application window 146, close an existing application window 146, render a new webpage in an existing browser tab 162, move a browser tab 162 to a different browser window 160).

In some examples, the query 110 is a prompt 111 that causes the language model 120 to use the session state information 112 as contextual data 126 for predicting textual responses 136. In some examples, the prompt 111 includes the user-generated query 152 and the session state information 112. If the session state information 112 includes an application window index 121, the language model 120 may generate and store textual data that describes the application window index 121. In some examples, the query 110 causes the language model 120 to store the session state information 112, but not return a textual response to the application 104. In some examples, the query 110 is configured as a prompt 111 that causes the language model 120 to be conditioned with the session state information 112. In some examples, the language model 120 is an already pre-trained language model configured to predict a textual response 156 for a given user-generated query 152, and the language model 120 is conditioned using the session state information 112.

Figure 1E:
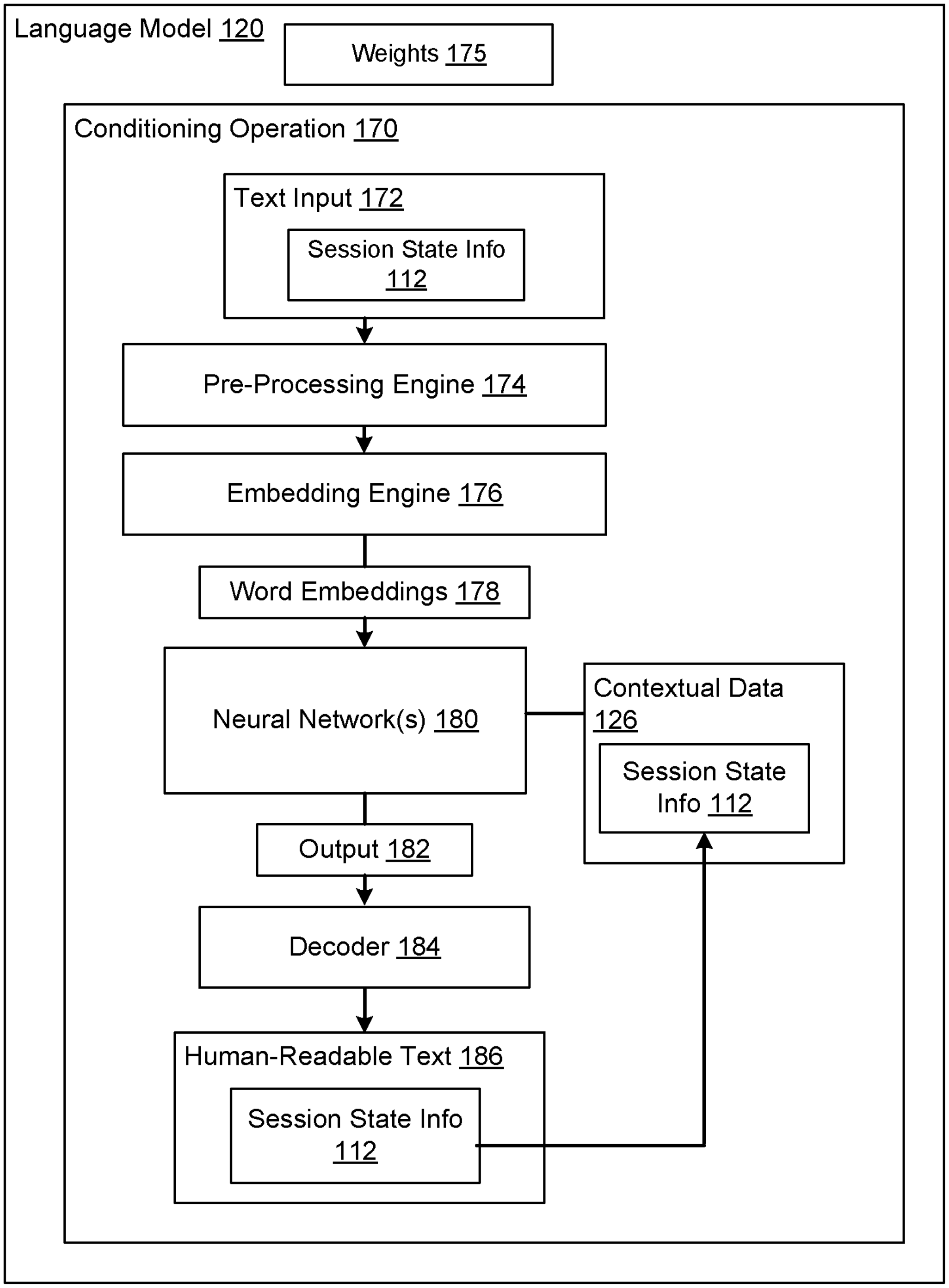
FIG. 1E illustrates an example of a language model during a conditioning operation according to an aspect.

As shown in FIG. 1E, the language model 120 includes weights 175. The weights 175 are numerical parameters that the language model 120 learns during the training process.

The weights 175 are used to compute the output (e.g., the textual response 156) of the language model 120. In some examples, conditioning the language model 120 using the session state information 112 may not involve adjusting one or more of the weights 175. In some examples, the session state information 112 may be considered additional data that is generated during deployment (or runtime) of the language model 120. When the session state information 112 is received as a text input 172, the language model 120 may execute a conditioning operation 170 to condition the language model 120 to generate textual responses 156 about the session items 144. In some examples, the language model 120 does not return textual responses 156 until at least an initial conditioning operation 170 is completed.

The language model 120 may include a pre-processing engine 174 configured to receive the session state information 112 (e.g., via the query 110 or the user-generated query 152) and may pre-process the session state information 112. Pre-processing may include converting the text input 172 to individual tokens (e.g., words, phrases, or characters). Pre-processing may include other operations such as removing stop words (e.g., "the", "and", "of") or other terms or syntax that do not impart any meaning to the language model 120. The language model 120 may include an embedding engine 176 configured to generate word embeddings 178 from the pre-processed session state information 112. The word embeddings 178 may be vector representations that assist the language model 120 to capture the semantic meaning of the input tokens and may assist the language model 120 to better understand the relationships between the input tokens. In some examples, the language model 120 stores the word embeddings 178 as contextual data 126.

The language model 120 includes neural network(s) 180 configured to receive the word embeddings 178 and generate an output 182. A neural network 180 includes multiple layers of interconnected neurons (e.g., nodes). The neural network 180 may include an input layer, one or more hidden layers, and an output later. The output 182 may include a sequence of output word probability distributions, where each output distribution represents the probability of the next word in the sequence given the input sequence so far. In some examples, the output 182 may be represented as a probability distribution over the vocabulary or a subset of the vocabulary. The language model 120 includes a decoder 184 configured to receive the output 182 and generate human-readable text 186 that represents the session state information 112. In some examples, the language model 120 stores the human-readable text 186, representing the session state information 112, as contextual data 126. In some examples, the decoder 184 may select the most likely next word or sub-word, sampling from a probability distribution, or using other techniques to generate coherent and contextually relevant human-readable text 186.

A user may submit a user-generated query 152 via the user interface 142 of the language model 120, where the user-generated query 152 includes a natural language description 154 about a session item 144 (e.g., "where is my music tab"). In some examples, the user-generated query 152 is entered by the user via a text interface. In some examples, the user-generated query 152 is received as a voice command. The language model 120 uses the session state information 112 to generate a textual response 156 about the session item(s) 144 (e.g., "it's the 3$^{rd}$ browser tab in the 2$^{nd}$ browser window"), which can be provided back in the user interface 142 of the language model 120.

Figure 1F:
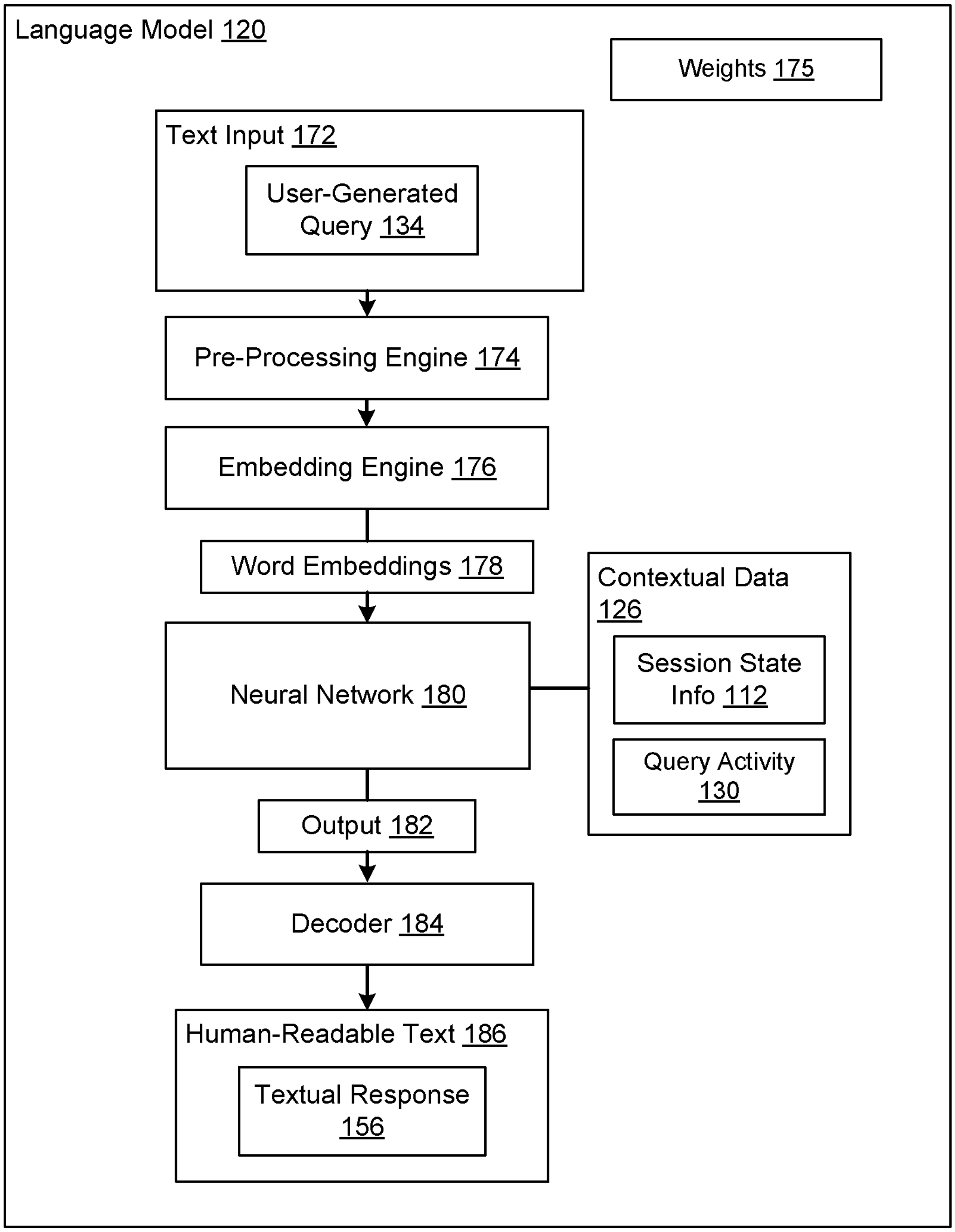
FIG. 1F illustrates an example of a language model for predicting a textual response according to an aspect.

Referring to FIG. 1F, when a user-generated query 134 is received as a text input 172, the pre-processing engine 174 may pre-process the user-generated query 134. Pre-processing may include converting the text input 172 to individual tokens (e.g., words, phrases, or characters). Pre-processing may include other operations such as removing stop words (e.g., "the", "and", "of") or other terms or syntax that do not impart any meaning to the language model 120. The embedding engine 176 is configured to generate word embeddings 178 from the pre-processed user-generated query 134. The word embeddings 178 may be vector representations that assist the language model 120 to capture the semantic meaning of the input tokens and may assist the language model 120 to better understand the relationships between the input tokens. In some examples, when the session state information 112 is included as part of the user-generated query 152, the embedding engine 176 may generate the word embedding 178 for the session state information 112 and the natural language description 154, and the neural network 180 uses those word embeddings 178 to generate the output 182.

The neural network(s) 180 is configured to receive the word embeddings 178 and generate an output 182 using the session state information 112, and, in some examples, the query activity 130 (e.g., previous user-generated queries 134 and textual responses 156). The output 182 may represent a version of the textual response 156. The output 182 may include a sequence of output word probability distributions, where each output distribution represents the probability of the next word in the sequence given the input sequence so far. In some examples, the output 182 may be represented as a probability distribution over the vocabulary or a subset of the vocabulary. The decoder 184 is configured to receive the output 182 and generate a textual response 156 as human-readable text 186. In some examples, the decoder 184 may select the most likely next word or sub-word, sampling from a probability distribution, or using other techniques to generate coherent and contextually relevant human-readable text 186 for the textual response 156.

As indicated above, the memory parameter 124 may control the amount of information that is used to predict the textual response 136. In some examples, the memory parameter 124 is a threshold defined in terms of characters or words (e.g., a ten-thousand-word limit). When the value of the memory parameter 124 is relatively high, the size/complexity of the language model 120 may increase, thereby increasing the amount of computing resources that are used to compute the prediction. Therefore, the value of the memory parameter 124 may correspond to a level of computer resources used to generate a prediction.

Figure 1G:
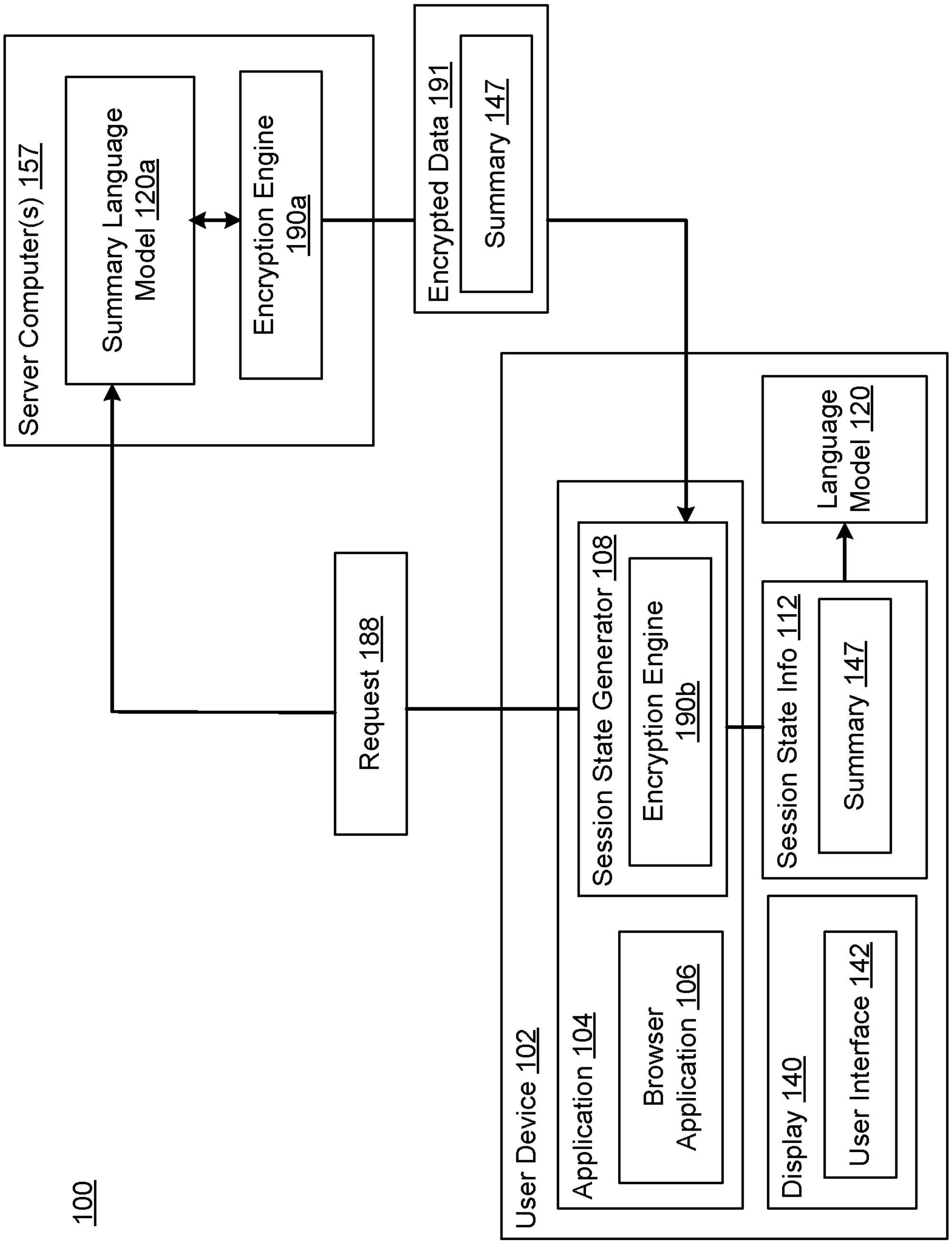
FIG. 1G illustrates an example of the system that uses a summary language model for generating summaries of content displayed or rendered in an application window according to an aspect.

In some examples, as shown in FIG. 1G, the system 100 may use a summary language model **120*a* to generate a summary 147 of content 145 included in application window 146, and the summary 147 is included in the session state information 112, which may enable the language model 120 to answer queries about content 145 rendered in the application window 146 but also keeping the memory parameter 124 relatively low, thereby reducing the amount of computing resources that are used to compute the prediction. In some examples, the content 145 is the content on a webpage, and the content 145 may be largely large (e.g., exceeding the amount of memory space defined by the memory parameter 124). However, by using a summary 147, generated by the summary language model 120*a*, a smaller portion of the memory space is used while (at the same time) enabling the language model 120 to answer queries about the content rendered in an application window 146**.

The summary language model **120*a* may be executable by one or more server computers 157. In some examples, the language model 120 is relatively small and may execute on the user device 102, but the summary language model 120***a* is relatively large and executes on the server computer 157. However, the computationally expensive process of generating a summary 147 may be offloaded to the server computer 157 to enable the language model 120 to execute on the user device 102. In some examples, the language model 120 and the summary language model 120*a* are executable by the server computer 157.

The session state generator 108 may generate and transmit (over the network 150) a request 188 to summarize content 145 rendered in an application window 146. In some examples, the session state generator 108 may generate the request 188 for a webpage rendered in a browser tab 162. In some examples, the session state generator 108 may generate the request 188 when a browser tab 162 is added to an application window index 121 (e.g., the tab index 125). In some examples, the session state generator 108 may generate the request 188 when a user-generated query 152 is submitted by the user. In some examples, the session state generator 108 determines whether or not to generate a request 188 to summarize content 145 rendered in an application window 146 based on one or more signals. The signals may include the time spent on a page (e.g., if the time spent on a page is over a threshold amount, the request 188 may be generated), click-through rate, bounce rate, and/or other signals relating to the webpage itself such as content quality and relevance, domain authority and age, and/or social signals.

The request 188 may include an identifier (e.g., a resource locator such as a URL) associated with the content 145. In some examples, the request 188 includes multiple identifiers (e.g., identifiers associated with webpages rendered in the browser tabs 162 included on the tab index 125). The server computer 157 may retrieve the content 145 using the identifier and provide the content 145 to the summary language model 120*a*. In some examples, the request 188 includes the content 145 itself.

The summary language model 120*a* may receive the content 145 as an input and generate a summary 147 as an output. The summary language model 120*a* may be an automatic summarization model. In some examples, the summary language model 120*a* may identify the most important (e.g., relevant, topical, etc.) sentences or phrases from a piece of text and extracts them to create a summary 147. In some examples, the summary language model 120*a* may generate new (original) sentences that capture the most important information from the original text. In some examples, the summary language model 120*a* is an example of the language model 120 and may include any of the details discussed with respect to the language model 120 but is used to generate a summary 147. In some examples, the summary language model 120*a* is a large pre-trained language model that is optimized to generate a summary 147 for given content 145.

The server computer 157 may include an encryption engine 190*a* configured to generate encrypted data 191. The encrypted data 191 may include the summary 147. In some examples, the server computer 157 does not include an encryption engine 190*a*, and the summary 147 is not encrypted. The session state generator 108 may receive the summary 147 generated by the summary language model 120*a* and include the summary 147 in the session state information 112. In some examples, the summary 147 is transmitted to the session state generator 108 as encrypted data 191. In some examples, the session state generator 108 may include an encryption engine 190*b* configured to decrypt the summary 147. In some examples, the encryption engine 190*b* is configured to encrypt the request 188. In some examples, the session state generator 108 does not include an encryption engine 190*b*.

The language model 120 may be configured to communicate with the summary language model 120*a* to obtain a summary 147 of content 145 rendered in the application windows 146. For example, instead of the session state generator 108 transmitting a request 188, the language model 120 (e.g., during the conditioning operation 170) may generate a request 188 to summarize content and transmit that request 188 to the summary language model 120*a*. In some examples, the language model 120 is executable by the user device 102 and the summary language model 120*a* is executable by the server computer(s) 157, and the language model 120 transmits the request 188 over the network 150 to the summary language model 120*a*. In some examples, the summary language model 120*a* is not a separate model, where the language model 120 generates a subroutine to summarize content 145 that has been identified in the session state information 112.

Figure 1H:
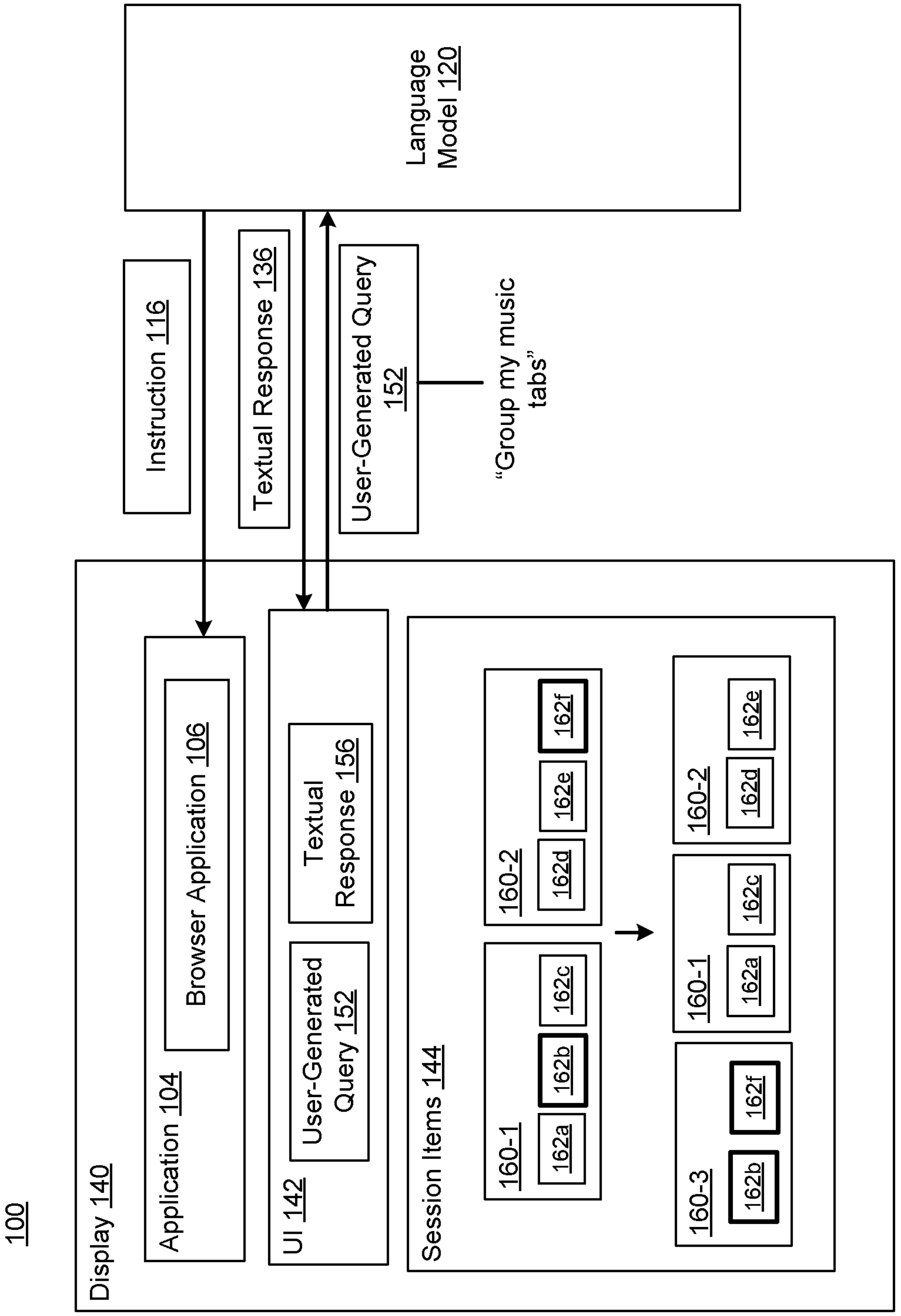
FIG. 1H illustrates an example of the system for generating an instruction for an action taken with respect to one or more application windows according to an aspect.

As indicated above, the system 100 may include a wide variety of actions that can be generated via the language model 120. Referring to FIG. 1H, the system 100 may enable a user to group browser tabs 162 relating to a certain subject matter (e.g., "music tabs"). Although FIG. 1H uses music tabs as an example, it is understood that the system 100 may group browser tabs 162 according to any type of subject matter (e.g., work tabs, personal tabs, document tabs, etc.). As shown in FIG. 1H, the user may have opened a browser window 160-1 with browser tab 162*a*, browser tab 162*b*, and browser tab 162*c* and a browser window 160-2 with browser tab 162*d*, browser tab 162*e*, and browser tab 162*f*. The user may enter a user-generated query 152 (e.g., "group my music tabs") via the user interface 142, which causes the language model 120 to receive and process the user-generated query 152. The language model 120 may identify browser tab 162*b* and browser tab 162*f* as relating to music. In some examples, the language model 120 may generate an instruction 116 (e.g., a browser instruction) which causes the application 104 (e.g., the browser application 106) to move the browser tab 162*b* and the browser tab 162*f* to a new browser window 160-3. In some examples, the language model 120 may generate a textual response 136 (e.g., "your music tabs have been grouped"), which is displayed on the user interface 142.

Figure 1I:
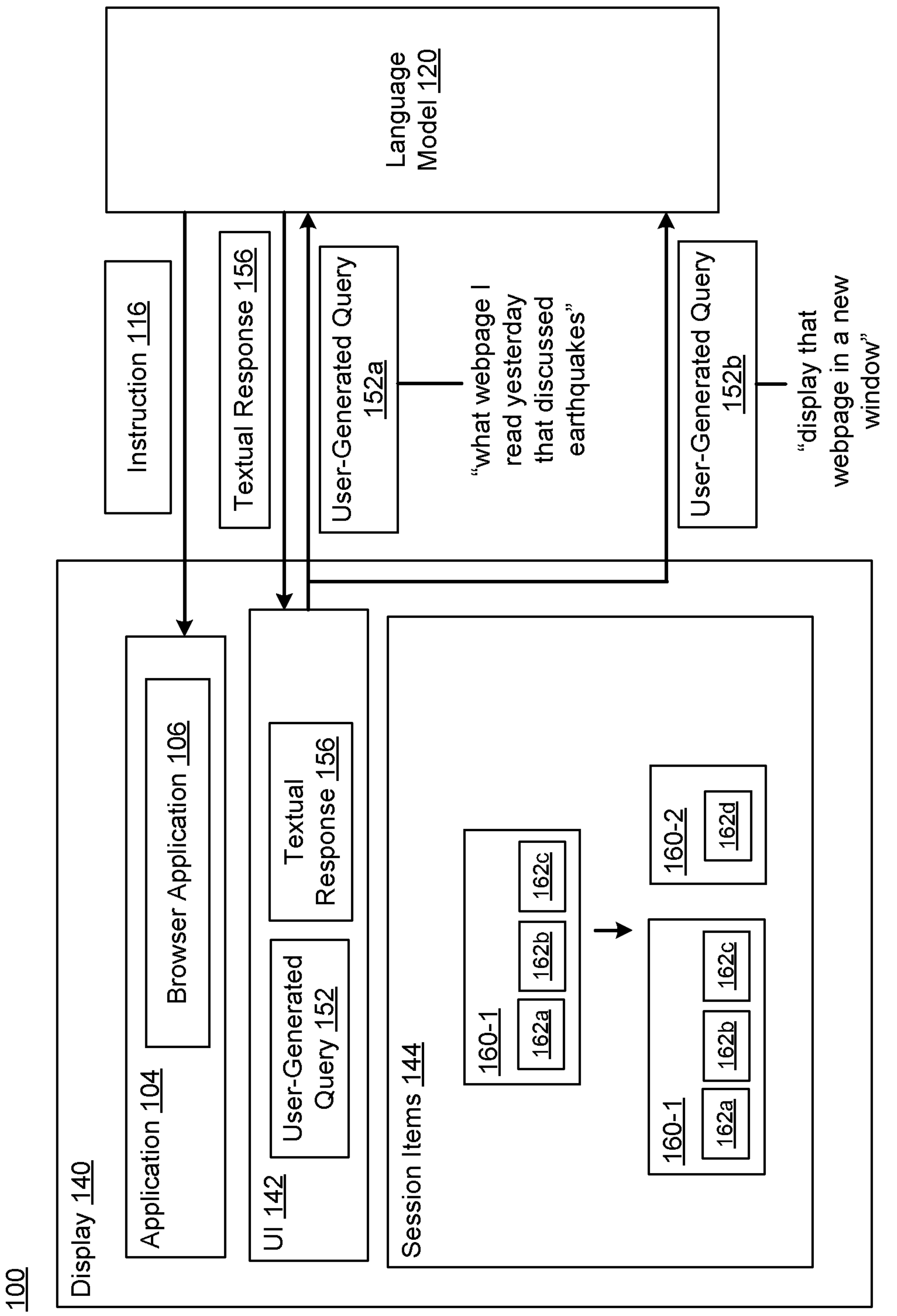
FIG. 1I illustrates an example of the system for generating an instruction for an action taken with respect to one or more application windows according to another aspect.

Referring to FIG. 1I, the system 100 may enable a user to identify a previous webpage visited by the user using a natural language command and display that webpage in a new browser tab 162*d*. For example, the user may have opened a browser window 160-1 with a browser tab 162*a*, a browser tab 162*b*, and a browser tab 162*c*. The user may enter a user-generated query 152*a* (e.g., "what webpage did I read yesterday that discussed earthquakes") via the user interface 142, which causes the language model 120 to receive and process the user-generated query 152*a*. The language model 120 may identify a webpage that discusses earthquakes from the session state information 112. For example, the session state information 112 may include the content 145 of the webpage that discussed earthquakes or may include a summary 147 generated by a summary language model 120*a*. The language model 120 may generate a textual response 156 in response to the user-generated query 152 (e.g., "the webpage that you read yesterday that discussed earthquakes is www.geographic.US.com"). The user may enter a user-generated query 152*b* (e.g., "display that webpage in a new window") in the user interface 142, which may cause the language model 120 to generate an instruction 116 to render that webpage in browser tab 162*d* in a new browser window 160-2.

The user device 102 may be any type of computing device that includes one or more processors 113, one or more memory devices 115, a display 140, and an operating system 107 configured to execute (or assist with executing) one or more applications, including the application 104 and the browser application 106. In some examples, the user device 102 is a laptop computer. In some examples, the user device 102 is a desktop computer. In some examples, the user device 102 is a tablet computer. In some examples, the user device 102 is a smartphone. In some examples, the user device 102 is a wearable device. In some examples, the display 140 is the display of the user device 102. In some examples, the display 140 may also include one or more external monitors that are connected to the user device 102.

The processor(s) 113 may be formed in a substrate configured to execute one or more machine executable instructions or pieces of software, firmware, or a combination thereof. The processor(s) 113 can be semiconductor-based—that is, the processors can include semiconductor material that can perform digital logic. The memory device(s) 115 may include a main memory that stores information in a format that can be read and/or executed by the processor(s) 113. The memory device(s) 115 may store the application 104 and/or the browser application 106 (and, in some examples, the language model 120) that, when executed by the processors 113, perform certain operations discussed herein. In some examples, the memory device(s) 115 includes a non-transitory computer-readable medium that includes executable instructions that cause at least one processor (e.g., the processors 113) to execute operations.

The server computer(s) 157 may be computing devices that take the form of a number of different devices, for example a standard server, a group of such servers, or a rack server system. In some examples, the server computer(s) 157 may be a single system sharing components such as processors and memories. In some examples, the server computer(s) 157 may be multiple systems that do not share processors and memories. The network 150 may include the Internet and/or other types of data networks, such as a local area network (LAN), a wide area network (WAN), a cellular network, satellite network, or other types of data networks. The network 150 may also include any number of computing devices (e.g., computers, servers, routers, network switches, etc.) that are configured to receive and/or transmit data within network 150. Network 150 may further include any number of hardwired and/or wireless connections.

The server computer(s) 157 may include one or more processors 161 formed in a substrate, an operating system (not shown) and one or more memory devices 163. The memory device(s) 163 may represent any kind of (or multiple kinds of) memory (e.g., RAM, flash, cache, disk, tape, etc.). In some examples (not shown), the memory devices may include external storage, e.g., memory physically remote from but accessible by the server computer(s) 157. The processor(s) 161 may be formed in a substrate configured to execute one or more machine executable instructions or pieces of software, firmware, or a combination thereof. The processor(s) 161 can be semiconductor-based—that is, the processors can include semiconductor material that can perform digital logic. The memory device(s) 163 may store information in a format that can be read and/or executed by the processor(s) 161. The memory device(s) 163 may store the summary language model 120*a*, and the encryption engine 190*a* (and, in some examples, the language model 120) that, when executed by the processor(s) 161, perform certain operations discussed herein. In some examples, the memory device(s) 163 includes a non-transitory computer-readable medium that includes executable instructions that cause at least one processor (e.g., the processor(s) 161) to execute operations.

Figure 2A:
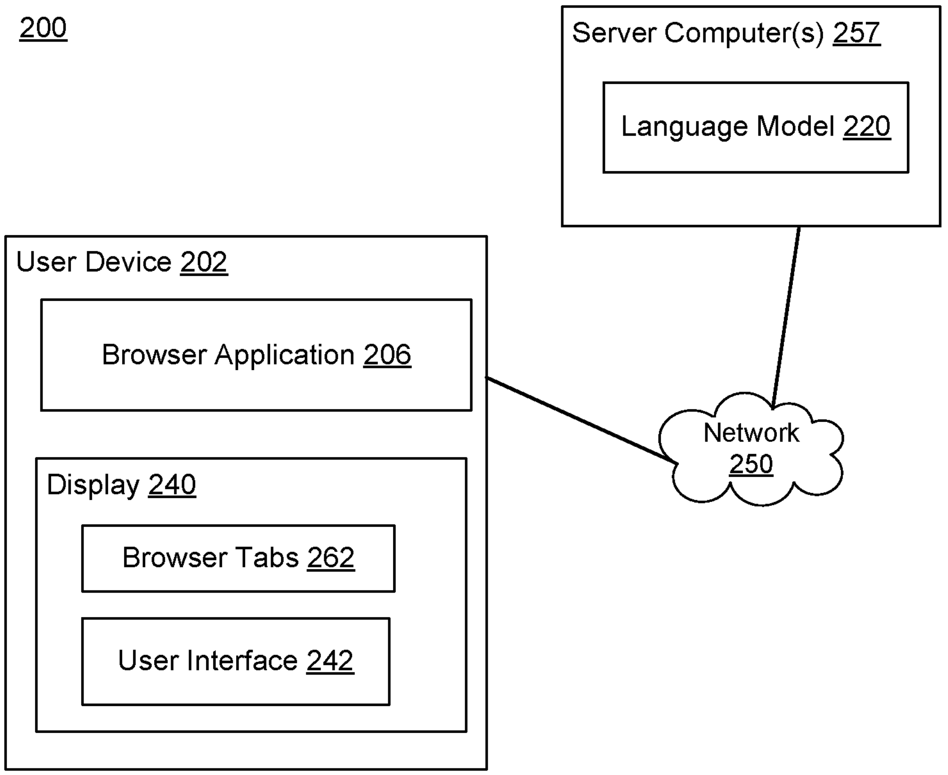
FIG. 2A illustrates a system that uses a language model to enable a user to locate, organize, and/or render browser tabs based on natural language queries according to an aspect.
Figure 2B:
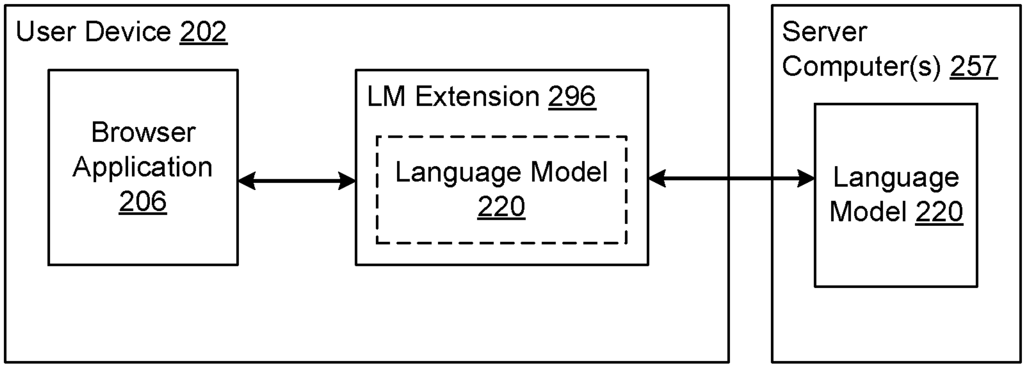
FIG. 2B illustrates an example of a language model extension associated with a browser application according to an aspect.

FIGS. 2A and 2B illustrate a system 200 that uses a language model 220 to enable a user to locate, organize, and/or render browser tabs 262 of a browser application 206 on a display 140 of a user device 102 based on natural language queries submitted via a user interface 242 of the language model 220. In some examples, the system 200 includes a tab management system configured to manage the browser tabs 262 that were opened by the user. The system 200 may be an example of the system 100 of FIGS. 1A through 1I and may include any of the details discussed with reference to those figures.

The browser application 206 includes a language model extension 296, which, when enabled, causes the use of session state information about the user's computer session as contextual data, thereby conditioning the language model 220 to answer natural language queries about their browser tabs 262. If the language model extension 296 is added (e.g., installed, downloaded, etc.) to the browser application 206, the language model extension 296 adds the tab management feature to the browser application 206. In some examples, the language model extension 296 may be HTML, CSS, and/or JavaScript based.

In some examples, the user can control whether or not the tab management feature is enabled by activating (or deactivating) the language model extension 296. When the language model extension 296 is activated, the browser application 206 may transmit an implicit request with the session state information previously described (e.g., session state information 112 of FIGS. 1A through 1I), which causes the language model 220 to use the session state information as contextual data 126, thereby conditioning the language model 220 to answer queries about the browser tabs 262. In some examples, when the language model extension 296 is activated, the language model extension 296 causes the user interface 242 (e.g., a chat interface) to be rendered on the display 240. In some examples, the user interface 242 is displayed (e.g., overlaid) on a browser tab 262 or is a user interface object that is included as part of the browser's user interface. In some examples, the user interface 242 is rendered on the display 240 after the language model 220 has been conditioned. In some examples, the user interface 242 is rendered on the display 240 when the language model extension 296 is activated, but a user may not submit a natural language query to the language model 220 until the language model 220 is conditioned using the session state information.

In some examples, the language model 220 is executable by one or more server computer(s) 257. The browser application 206 may communicate (over the network 250) with the language model 220 via the language model extension 296 to transmit the implicit queries and receive commands (e.g., browser commands). Natural language queries and textual responses generated by the language model 220 may be communicated between the user interface 242 and the language model 220 via the language model extension 296. In some examples, the language model 220 is executable on the user device 202. In some examples, the language model extension 296 includes the language model 220, and the browser application 206 and the language model 220 may communicate via any type of inter-application communication protocol.

Figure 3:
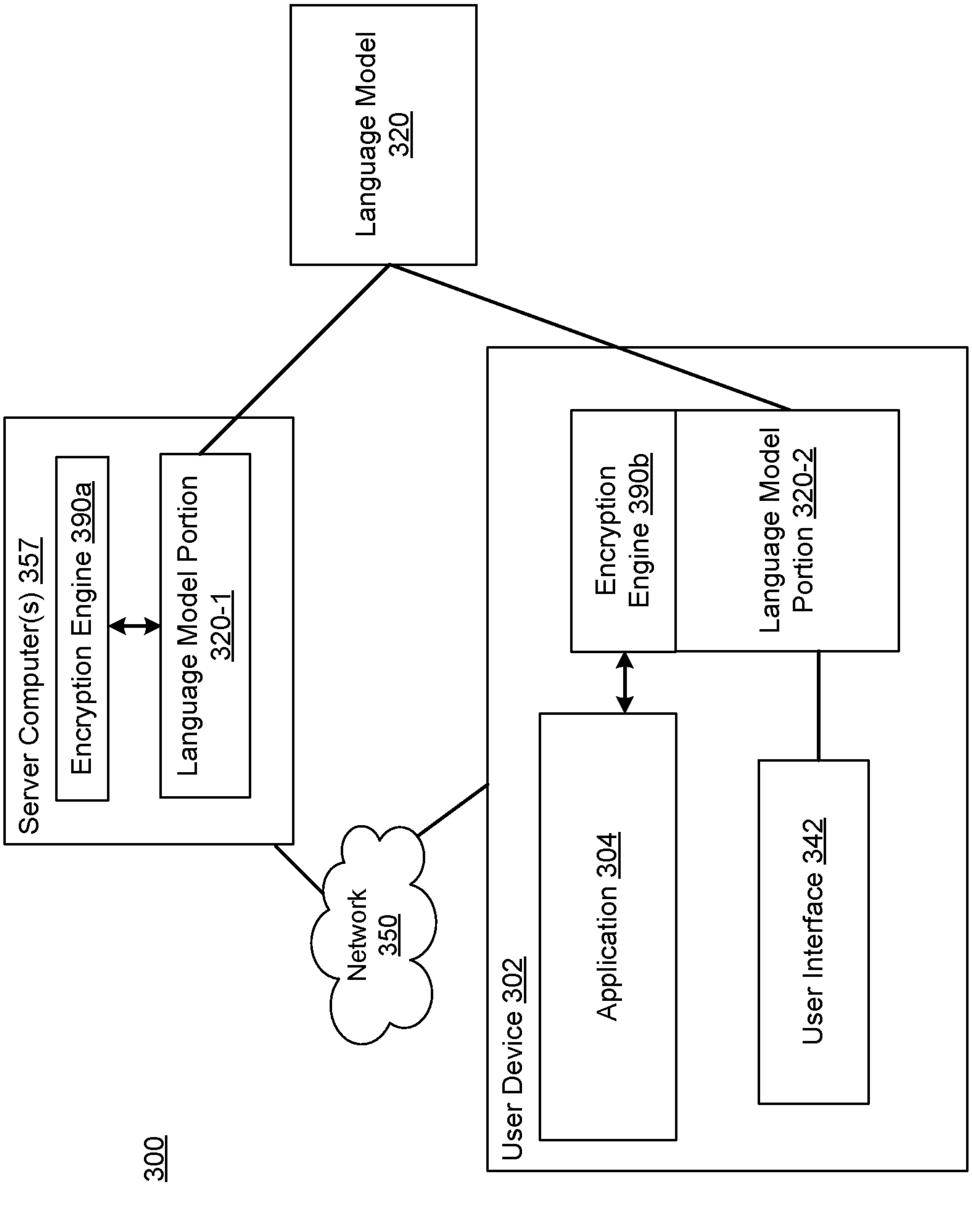
FIG. 3 illustrates a system that distributes a language model on a user device and one or more server computers according to an aspect.

FIG. 3 illustrate a system 300 that uses a language model 320 to enable a user to locate, organize, and/or render session items (e.g., browser tabs, and, in some examples, other types of application windows, settings, or display states) of an application 304 (which may be a browser application or an operating system of a user device 302) based on natural language queries submitted via a user interface 342 of the language model 320. The system 300 may be an example of the system 100 of FIGS. 1A through 1I and/or the system 200 of FIGS. 2A and 2B and may include any of the details discussed with reference to those figures.

By distributing language model operations between the user device 302 and the server computer(s) 357, the system 300 may reduce computer resource management (e.g., CPU, memory) associated with executing a language model 320 and/or improve data privacy associated with in-context learning. The language model 320 may include a language model portion 320-1 executable by one or more server computers 357, and a language model portion 320-2 executable by the user device 302.

In some examples, the language model portion 320-2 includes the pre-processing engine 174 of FIGS. 1E and 1F. In some examples, the language model portion 320-2 includes the embedding engine 176 of FIGS. 1E and 1F. In some examples, the user device 302 includes an encryption engine 390*b* configured to encrypt word embeddings generated by the embedding engine and transmit, over the network 350, the encrypted word embeddings to the language model portion 320-1 executing on the server computer(s) 357. In some examples, the user device 302 does not include an encryption engine 390*b*. In some examples, the language model portion 320-2 includes the neural network (s) 180 of FIGS. 1E and 1F. In some examples, the encryption engine 390*b* is configured to encrypt the output of the neural network and transmit, over the network 350, the encrypted output for decoding by the language model portion 320-1.

In some examples, the language model portion 320-1 includes the neural network(s) 180. In some examples, the server computer(s) 357 includes an encryption engine 390*a* configured to decrypt the word embeddings received over the network 350 from the user device 302. In some examples, the server computer(s) 357 does not include an encryption engine 390*a*. In some examples, the language model portion 320-1 includes the decoder 184 of FIGS. 1E and 1F (e.g., only the decoder 184). In some examples, the encryption engine 390*a* is configured to decrypt the output of the neural network received over the network 350 from the user device 302, and the decoder 184, executable by the server computer(s) 357, is configured to generate human-readable text, which is transmitted to the user device 302.

Figure 4:
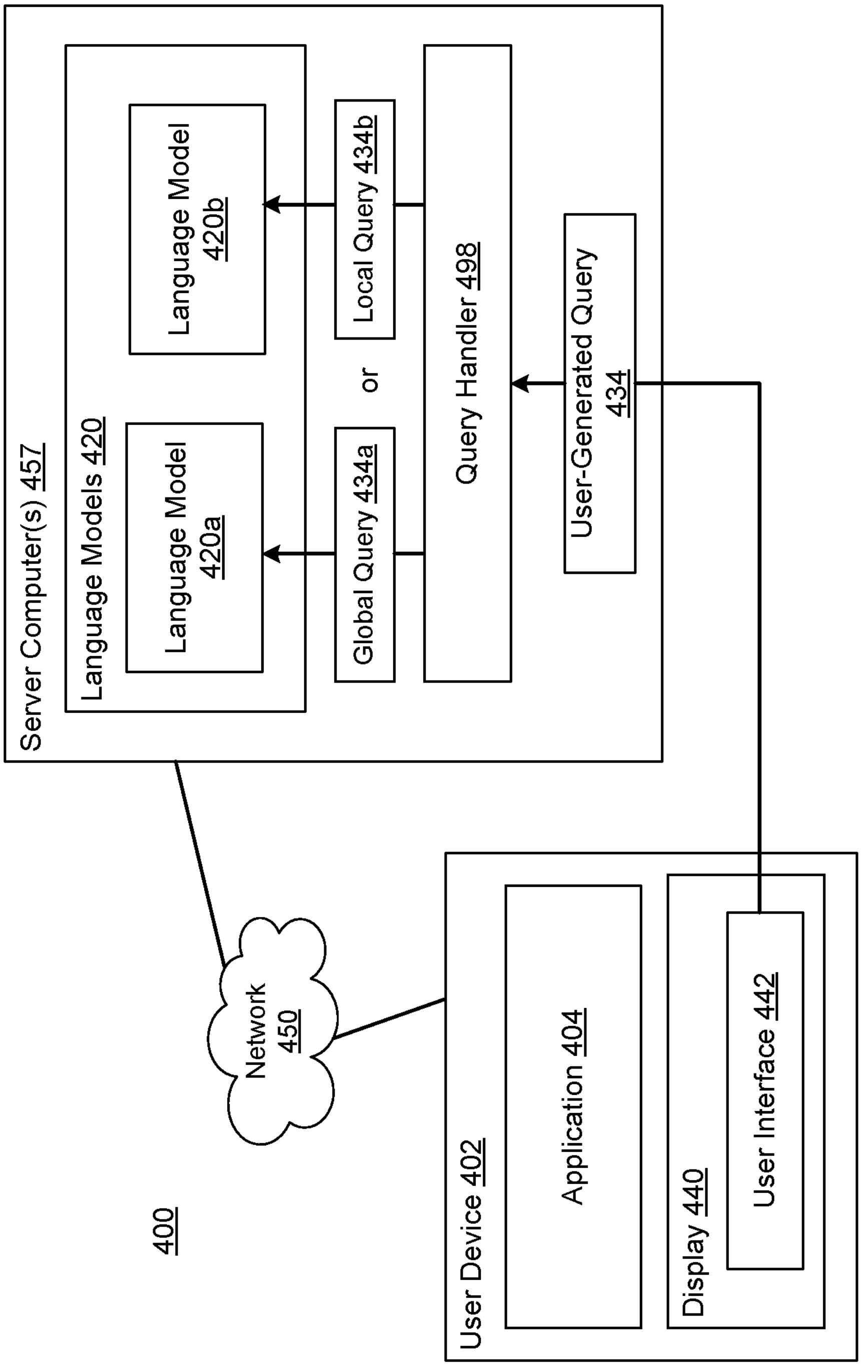
FIG. 4 illustrates a system that includes one or more language models for answering local queries and global queries according to an aspect.

FIG. 4 illustrate a system 400 that uses a language model 420 to enable a user to locate, organize, and/or render session items (e.g., browser tabs, and, in some examples, other types of application windows, settings, or display states) of an application 404 (which may be a browser application or an operating system of a user device 402) based on natural language queries submitted via a user interface 442 on a display 440 of the user device 402. The system 400 may be an example of the system 400 of FIGS. 1A through 1I, the system 200 of FIGS. 2A and 2B, and/or the system 300 of FIG. 3 and may include any of the details discussed with reference to those figures.

The system 400 may include multiple language models 420 such as a language model 420*a* and a language model 420*b*. In some examples, the language model 420*a* and the language model 420*b* are executable by one or more server computers 457. In some examples, the language model 420*a* and the language model 420*b* are separate models. In some examples, the language model 420*a* and the language model 420*b* form a single language model but represent two different subroutines of the language model. The language model 420*a* may be a large language model configured to answer language queries about general topics. For example, the language model 420*a* may be a generic, pre-trained neural-network based model configured to understand, summarize, generate, and predict new content for a given user-generated query 434. In some examples, the language model 420*a* is a model similar to the language model 120 of FIGS. 1A through 1I but is not conditioned to answer queries about application windows opened by the user on the user device 402. In some examples, the language model 420*b* is the language model 120 of FIGS. 1A through 1I (e.g., a language model with in-context learning).

As shown in FIG. 4, the display 440 may display a user interface 442 of the language models 420*a*, 420*b*, which may receive a user-generated query 434 over a network 450. In some examples, the server computer(s) 457 may include a query handler 498 configured to determine whether the user-generated query 434 relates to a global query 434*a* or a local query 434*b*. A global query 434*a* is a natural language query that requests an answer for information that is not specific to the user's computer activity (e.g., "what is the capital of France", "write me a fiction story", etc.). A local query 434*b* is a query about one or more session items (e.g., browser tabs) created on the user device 402. In some examples, the query handler 498 is a subroutine of a language model 420, e.g., the language model 420*a* or the language model 420*b*. In response to the query handler 498 determining that the user-generated query 434 is a global query 434*a*, the language model 420*a* may generate a textual response for the user-generated query 434 (e.g., "the capital of France is Paris"). In response to the query handler 498 determining that the user-generated query 434 is a local query 434*b* (e.g., "where is my music tab"), the language model 420*b* may generate a textual response about the session item(s) in accordance with the techniques discussed with reference to FIGS. 1A through 1I, 2A, 2B, and 3.

FIG. 5 is a flowchart 500 depicting example operations of a system for managing session items using a language model. The flowchart 500 may depict operations of a computer-implemented method. Although the flowchart 500 is explained with respect to the system 100 of FIGS. 1A through 1I, the flowchart 500 may be applicable to any of the implementations discussed herein. Although the flowchart 500 of FIG. 5 illustrates the operations in sequential order, it will be appreciated that this is merely an example, and that additional or alternative operations may be included. Further, operations of FIG. 5 and related operations may be executed in a different order than that shown, or in a parallel or overlapping fashion. The flowchart 500 may depict a computer-implemented method.

The operations of the flowchart 500 may provide a technical solution to support a wide range of natural language queries about computer content rendered on the user device while overcoming one or more technical problems of computer resource management (e.g., CPU, memory usage) associated with using a language model and/or data security associated with in-context learning using user-based information regarding which session items were launched on the user device. Some natural language queries supported by the system may include "Where's my music tab", "Group my music tabs", "What webpage did a read yesterday that discussed earthquakes" and/or "display that webpage in a new window."

Operation 502 includes receiving, by a language model 120, session state information 112, generated by a browser application 106, about a computer session of a user. Operation 504 includes receiving, by the language model 120, a user-generated query 152 including a natural language description 154 about a browser tab 162. Operation 506 includes generating, by the language model 120, a textual response 156 about the browser tab 162 using contextual data 126, the contextual data 126 including the session state information 112. Operation 508 includes providing the textual response 156 on a user device 102.

In some aspects, the techniques described herein relate to a computer-implemented method including: receiving, by a language model, session state information, generated by a browser application, about a computer session of a user; receiving, by the language model, a user-generated query including a natural language description about a browser tab; generating, by the language model, a textual response about the browser tab using contextual data, the contextual data including the session state information; and providing the textual response on a user device.

In some aspects, the techniques described herein relate to a computer-implemented method, wherein the language model includes a memory parameter defining an amount of contextual data used to generate the textual response, the computer-implemented method further including: adjusting a value of the memory parameter based on at least one of the session state information or query activity of the language model.

In some aspects, the techniques described herein relate to a computer-implemented method, wherein the textual response includes information that identifies a location of the browser tab on a display of the user device.

In some aspects, the techniques described herein relate to a computer-implemented method, further including: generating, by the language model, a browser instruction from the textual response; and transmitting, by the language model, the browser instruction to the browser application, the browser instruction configured to cause the browser application to execute an action with respect to the browser tab.

In some aspects, the techniques described herein relate to a computer-implemented method, wherein the browser instruction is configured to cause the browser application to visually identify the browser tab on a display of the user device.

In some aspects, the techniques described herein relate to a computer-implemented method, wherein the browser instruction is configured to cause the browser application to group a plurality of browser tabs.

In some aspects, the techniques described herein relate to a computer-implemented method, further including: receiving, by the language model, a prompt, the prompt including the user-generated query and the session state information.

In some aspects, the techniques described herein relate to a computer-implemented method, wherein the session state information includes at least one of a tab index, a browser window index, or a browser history index.

In some aspects, the techniques described herein relate to a computer-implemented method, wherein the session state information includes a snippet description about an application or webpage executed by the browser tab.

In some aspects, the techniques described herein relate to a computer-implemented method, wherein the language model is a first language model, the computer-implemented method further including: transmitting, to a second language model, a request for a summary description of content rendered in the browser tab; and receiving, from the second language model, the summary description, wherein the session state information includes the summary description.

In some aspects, the techniques described herein relate to an apparatus including: at least one processor; and a non-transitory computer-readable medium storing executable instructions that cause the at least one processor to: receive, by a language model, session state information, generated by a browser application, about a computer session of a user; receive, by the language model, a user-generated query including a natural language description about a browser tab; generate, by the language model, a textual response about the browser tab using contextual data, the contextual data including the session state information; and provide the textual response on a user device.

In some aspects, the techniques described herein relate to an apparatus, wherein the language model includes a memory parameter defining an amount of contextual data used to generate the textual response, the executable instructions including instructions that cause the at least one processor to: adjust a value of the memory parameter based on at least one of the session state information or query activity of the language model.

In some aspects, the techniques described herein relate to an apparatus, wherein the textual response includes information that identifies a location of the browser tab on a display of the user device.

In some aspects, the techniques described herein relate to an apparatus, wherein the executable instructions include instructions that cause the at least one processor to: generate, by the language model, a browser instruction from the textual response; and transmit, by the language model, the browser instruction to the browser application, the browser instruction configured to cause the browser application to execute an action with respect to the browser tab.

In some aspects, the techniques described herein relate to an apparatus, wherein the browser instruction is configured to cause the browser application to visually identify the browser tab on a display of the user device.

In some aspects, the techniques described herein relate to an apparatus, wherein the browser instruction is configured to cause the browser application to group a plurality of browser tabs.

In some aspects, the techniques described herein relate to a non-transitory computer-readable medium storing executable instructions that cause at least one processor to execute operations, the operations including: receiving, by a language model, session state information, generated by a browser application, about a computer session of a user; receiving, by the language model, a user-generated query including a natural language description about a browser tab; generating, by the language model, a textual response about the browser tab using contextual data, the contextual data including the session state information; and providing the textual response on a user device.

In some aspects, the techniques described herein relate to a non-transitory computer-readable medium, wherein the language model includes a memory parameter defining an amount of contextual data used to generate the textual response, the operations further including: adjusting a value of the memory parameter based on at least one of the session state information or query activity of the language model.

In some aspects, the techniques described herein relate to a non-transitory computer-readable medium, wherein the operations further include: generating, by the language model, a browser instruction from the textual response; and transmitting, by the language model, the browser instruction to the browser application, the browser instruction configured to cause the browser application to execute an action with respect to the browser tab.

In some aspects, the techniques described herein relate to a non-transitory computer-readable medium, wherein the browser instruction is configured to cause the browser application to visually identify the browser tab on a display of the user device or cause the browser application to group a plurality of browser tabs.

In some aspects, the techniques described herein relate to a method comprising: generating, by a browser application, session state information about a computer session of a user; transmitting, by the browser application, one or more prompts to a language model, the one or more prompts including the session state information and a user-generated query, the user-generated query including a natural language description about a browser tab; receiving, by the browser application and from the language model, a textual response about the browser tab; and providing the textual response to a user. The providing may include displaying, by the browser application, the textual response on a display of a user device. The providing may include providing the textual response as audio data. In some aspects, the method further comprises: receiving, by the browser application and from the language model, a browser instruction; and executing, by the browser application, an action with respect to the browser tab. In some aspects, the method includes adjusting, by a browser application, a value of the memory parameter based on at least one of the session state information or query activity of the language model. In some aspects, the textual response includes information that identifies a location of the browser tab on a display of the user device. In some aspects, the method includes visually identifying, by the browser application, the browser tab on a display of the user device. In some aspects, the method includes grouping a plurality of browser tabs. In some aspects, the session state information includes at least one of a tab index, a browser window index, or a browser history index. In some aspects, the session state information includes a snippet description about an application or webpage executed by the browser tab. In some aspects, the transmitting includes transmitting a first prompt that includes the session state information and transmitting a second prompt that includes the user-generated query.

In some aspects, the techniques described herein relate to a method comprising: generating, by a browser application, session state information about a computer session of a user; transmitting, by the browser application, one or more prompts to a language model, the one or more prompts including the session state information and a user-generated query, the user-generated query including a natural language description about a browser tab; receiving, by the browser application and from the language model, a textual response about the browser tab; and executing, by the browser, an action based on the textual response. In some aspects, the action includes visually identifying, by the browser application, the browser tab on a display of the user device. In some aspects, the action includes grouping a plurality of browser tabs. In some aspects, the session state information includes at least one of a tab index, a browser window index, or a browser history index. In some aspects, the session state information includes a snippet description about an application or webpage executed by the browser tab. In some aspects, the transmitting includes transmitting a first prompt that includes the session state information and transmitting a second prompt that includes the user-generated query.

In some aspects, the techniques described herein relate to an apparatus having at least one processor and a non-transitory computer-readable medium storing executable instructions that cause the at least one processor to: generate, by a browser application, session state information about a computer session of a user; transmit, by the browser application, one or more prompts to a language model, the one or more prompts including the session state information and a user-generated query, the user-generated query including a natural language description about a browser tab; receive, by the browser application and from the language model, a textual response about the browser tab; and displaying, by the browser application, the textual response on a display of a user device. In some aspects, the executable instructions include instructions that cause the at least one processor to: receive, by the browser application and from the language model, a browser instruction; and execute, by the browser application, an action with respect to the browser tab.

In some aspects, the executable instructions include instructions that cause the at least one processor to: adjust, by a browser application, a value of the memory parameter based on at least one of the session state information or query activity of the language model. In some aspects, the textual response includes information that identifies a location of the browser tab on a display of the user device. In some aspects, the executable instructions include instructions that cause the at least one processor to: visually identify, by the browser application, the browser tab on a display of the user device. In some aspects, the executable instructions include instructions that cause the at least one processor to: group a plurality of browser tabs. In some aspects, the session state information includes at least one of a tab index, a browser window index, or a browser history index. In some aspects, the session state information includes a snippet description about an application or webpage executed by the browser tab.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In this specification and the appended claims, the singular forms "a," "an" and "the" do not exclude the plural reference unless the context clearly dictates otherwise. Further, conjunctions such as "and," "or," and "and/or" are inclusive unless the context clearly dictates otherwise. For example, "A and/or B" includes A alone, B alone, and A with B. Further, connecting lines or connectors shown in the various figures presented are intended to represent example functional relationships and/or physical or logical couplings between the various elements. Many alternative or additional functional relationships, physical connections or logical connections may be present in a practical device. Moreover, no item or component is essential to the practice of the implementations disclosed herein unless the element is specifically described as "essential" or "critical".

Terms such as, but not limited to, approximately, substantially, generally, etc. are used herein to indicate that a precise value or range thereof is not required and need not be specified. As used herein, the terms discussed above will have ready and instant meaning to one of ordinary skill in the art.

Moreover, use of terms such as up, down, top, bottom, side, end, front, back, etc. herein are used with reference to a currently considered or illustrated orientation. If they are considered with respect to another orientation, it should be understood that such terms must be correspondingly modified.

Further, in this specification and the appended claims, the singular forms "a." "an" and "the" do not exclude the plural reference unless the context clearly dictates otherwise. Moreover, conjunctions such as "and," "or," and "and/or" are inclusive unless the context clearly dictates otherwise. For example, "A and/or B" includes A alone, B alone, and A with B.

Although certain example methods, apparatuses and articles of manufacture have been described herein, the scope of coverage of this patent is not limited thereto. It is to be understood that terminology employed herein is for the purpose of describing particular aspects and is not intended to be limiting. On the contrary, this patent covers all methods, apparatus and articles of manufacture fairly falling within the scope of the claims of this patent.

What is claimed is:

1. A computer-implemented method comprising:
- rendering, on a computing device, an interface to communicate with a language model;
- generating context data about computer activity of a user on the computing device, the context data being associated with a user session of the user and including information about a plurality of browser tabs opened on the computing device;
- conditioning the language model by transmitting a first prompt to the language model via a background request between the computing device and the language model, the first prompt including the context data;
- receiving, via the interface, a user-generated query about a browser tab of the plurality of browser tabs;
- transmitting a second prompt to the language model via an explicit request between the interface and the language model, the second prompt being associated with the user session and including the user-generated query;
- receiving, from the language model, a model response about the browser tab, the model response being generated by the language model using at least a portion of the context data of the first prompt and the user-generated query of the second prompt; and
- providing the model response in the interface of the language model.

2. The computer-implemented method of claim 1, wherein the context data includes display information about a position and a size of the plurality of browser tabs, the model response including a natural language description, generated by the language model, about a location of the browser tab on a display of the computing device.

3. The computer-implemented method of claim 1, wherein the model response includes executable code generated by the language model, the computer-implemented method further comprising:
- executing the executable code to execute an action with respect to the browser tab.

4. The computer-implemented method of claim 3, further comprising:
- in response to execution of the executable code, visually identifying the browser tab on a display of the computing device, including adding a visual element to the display to highlight the browser tab.

5. The computer-implemented method of claim 1, wherein the context data includes information about one or more non-browser applications opened on the computing device.

6. The computer-implemented method of claim 1, wherein the context data includes a description about an application or webpage executed by the browser tab.

7. The computer-implemented method of claim 1, further comprising:
- determining whether to transmit a request to summarize content in the browser tab based on one or more user engagement signals associated with the browser tab;
- in response to determining to transmit the request, transmitting the request to the language model; and
- receiving, from the language model, a summary description of the content in the browser tab, wherein the first prompt includes the summary description of the browser tab.

8. The computer-implemented method of claim 1, wherein transmitting the first prompt is triggered by rendering of the interface of the language model, wherein the model response is not generated by the language model until the context data is stored at the language model.

9. The computer-implemented method of claim 1, wherein the user-generated query is a first user-generated query, and the model response is a first model response, further comprising:
- receiving, via the interface, a second user-generated query about a request to adjust an operating system setting;
- transmitting a third prompt to the language model, the third prompt including the second user-generated query;
- receiving, from the language model, a second model response having an executable instruction, the second model response being generated by the language model using the context data of the first prompt and the second user-generated query of the third prompt; and
- executing, by an operating system of the computing device, the executable instruction to adjust the operating system setting.

10. The computer-implemented method of claim 9, wherein the operating system setting includes a split-screen setting, a picture-in-picture setting, or a full-mode display screen setting.

11. The computer-implemented method of claim 1, wherein the language model is a large language model configured to answer queries about general topics, the language model including one or more neural networks, the interface of the language model being a direct interface of the language model.

12. The computer-implemented method of claim 1, further comprising:
- adjusting a value of a context parameter of the language model based on whether a number of previous user-generated queries to the interface of the language model are received within a threshold period of time, the context parameter defining a threshold number of tokens used to generate the model response.

13. The computer-implemented method of claim 1, wherein the first prompt is transmitted in a background process without user prompting.

14. The computer-implemented method of claim 1, further comprising:
- converting the context data to vector representations; and
- storing the vector representations at the language model.

15. A computing device comprising:
- at least one processor; and
- a non-transitory computer-readable medium storing executable instructions that cause the at least one processor to:
  - render, on the computing device, an interface to communicate with a language model;
  - generate context data about computer activity of a user on the computing device, the context data being associated with a user session of the user and including information about a plurality of browser tabs opened on the computing device;
  - condition the language model by transmitting a first prompt to the language model via a background request between the computing device and the language model, the first prompt including the context data associated with the user session;
  - receive, via the interface, a user-generated query about a browser tab of the plurality of browser tabs;
  - transmit a second prompt to the language model via an explicit request between the interface and the language model, the second prompt being associated with the user session and including the user-generated query;
  - adjust a value of a context parameter of the language model based on whether a number of previous user-generated queries to the interface are received within a threshold period of time, the context parameter defining a threshold number of tokens used to generate a model response; and
  - provide the model response on the interface of the language model, the model response being generated by the language model using the context data of the first prompt and the user-generated query of the second prompt.

16. The computing device of claim 15, wherein the context data includes display information about a position and a size of the plurality of browser tabs, the model response including a natural language description, generated by the language model, about a location of the browser tab on a display of the computing device.

17. The computing device of claim 15, wherein the model response includes executable code generated by the language model, the executable instructions including instructions that cause the at least one processor to:
- execute the executable code to an action with respect to the browser tab.

18. The computing device of claim 14, wherein the executable instructions include instructions that cause the at least one processor to:
- in response to execution of the executable code, visually identify the browser tab on a display of the computing device.

19. The computing device of claim 17, wherein the executable instructions include instructions that cause the at least one processor to:
- in response to execution of the executable code, close the browser tab as being a duplicate of another browser tab.

20. A non-transitory computer-readable medium storing executable instructions that cause at least one processor to execute operations, the operations comprising:
- rendering, on a computing device, an interface to communicate with a language model;
- generating context data about computer activity of a user on the computing device, the context data being associated with a user session of the user and including information about a plurality of browser tabs opened on the computing device;
- conditioning the language model by transmitting a first prompt to the language model via a background request between the computing device and the language model, the first prompt including-based on the context data associated with the user session;
- receiving, via the interface of the language model, a user-generated query about a browser tab rendered on the computing device;
- transmitting a second prompt to the language model via an explicit request between the interface and the language model, the second prompt being associated with the user session and including the user-generated query;
- receiving, from the language model, a model response about the browser tab, the model response being generated by the language model using the context data of the first prompt and the user-generated query of the second prompt; and providing the model response on the interface of the language model.

21. The non-transitory computer-readable medium of claim 20, wherein the model response includes executable code generated by the language model, wherein the operations further comprise:

executing the executable code with respect to the browser tab.

22. The non-transitory computer-readable medium of claim 21, wherein the operations further comprise:

in response to execution of the executable code, close the browser tab as being a duplicate of another browser tab.

23. The non-transitory computer-readable medium of claim 20, wherein the operations further comprise:

in response to selection of a user control that activates the interface of the language model, rendering the interface of the language model on the computing device; and in response to the interface of the language model being rendered on the computing device, transmitting the first prompt.

24. The non-transitory computer-readable medium of claim 20, wherein the operations further comprise:

adjusting a value of a context parameter of the language model based on whether a number of previous user-generated queries to the interface of the language model are received within a threshold period of time, the context parameter defining a threshold number of tokens used to generate the model response.

* * * * *